(12) United States Patent
Makuta et al.

(10) Patent No.: US 11,453,230 B2
(45) Date of Patent: Sep. 27, 2022

(54) IMAGE FORMING METHOD

(71) Applicant: FUJIFILM Corporation, Tokyo (JP)

(72) Inventors: Toshiyuki Makuta, Kanagawa (JP); Shigeaki Nimura, Kanagawa (JP); Hiroshi Inada, Kanagawa (JP); Rie Takasago, Kanagawa (JP); Tomohiro Mizuno, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 14 days.

(21) Appl. No.: 17/033,670

(22) Filed: Sep. 25, 2020

(65) Prior Publication Data

US 2021/0008916 A1    Jan. 14, 2021

Related U.S. Application Data

(63) Continuation of application No. PCT/JP2019/012257, filed on Mar. 22, 2019.

(30) Foreign Application Priority Data

Mar. 29, 2018   (JP) .............................. JP2018-065139

(51) Int. Cl.
*B41M 5/00* (2006.01)
*B41J 2/01* (2006.01)
(Continued)

(52) U.S. Cl.
CPC .............. *B41M 5/0023* (2013.01); *B41J 2/01* (2013.01); *B41J 2/2107* (2013.01); *C09D 11/328* (2013.01); *C09D 11/38* (2013.01)

(58) Field of Classification Search
CPC .... B41J 3/4078; B41J 11/0021; B41J 11/002; B41J 29/02; B41J 2/17513; B41J 2/17509;
(Continued)

(56) References Cited

U.S. PATENT DOCUMENTS 7,510,741 B2 * 3/2009 Pokorny .............. G02B 5/3016
                                                        427/407.1
8,556,404 B2   10/2013 Nakane
(Continued)

FOREIGN PATENT DOCUMENTS

| CN | 101354459 | 1/2009 |
| CN | 103314076 | 9/2013 |

(Continued)

OTHER PUBLICATIONS

Office Action of Japan Counterpart Application, with English translation thereof, dated Oct. 19, 2021, pp. 1-8.
(Continued)

*Primary Examiner* — Manish S Shah
(74) *Attorney, Agent, or Firm* — JCIPRNET

(57) ABSTRACT

Provided is an image forming method including a step of imagewisely applying, onto a base material by an inkjet method, at least two inks containing a polymerizable liquid crystal compound, a chiral compound, and a polymerization initiator and having reflection wavelengths different from each other, such that the total application amount of the inks provides an image area ratio of 50% or more in an image forming region.

7 Claims, 2 Drawing Sheets

(51) Int. Cl.
  *C09D 11/328* (2014.01)
  *C09D 11/38* (2014.01)
  *B41J 2/21* (2006.01)

(58) Field of Classification Search
  CPC ...... B41J 29/13; B41J 2/17553; B41J 2/1606;
   B41J 2/1642; B41J 2/1609; B41J 2/1433;
   B41J 2/164; B41J 2/162; B41J 2/161;
   B41J 2/19; B41J 15/04; B41J 2/1623;
   B41J 2202/00; B41J 2202/03; B41J
   2/14201; B41J 2/045; B41J 11/0015;
   B41J 2/04581; B41J 2/055; B41J
   2/16538; B41J 2002/16502; B41J
   2/04588; B41J 2/04595; B41J 2/04586;
   B41J 2/14274; B41J 2/01; B41J 2/211;
   B41J 2/17; B41J 2/17593; B41J 2/2107;
   B41J 2/1755; B41J 2/2114; B41J 2/2117;
   B41J 2/2056; B41J 2/21; B41J 2/0057;
   B41J 3/60; B41J 2002/012; B41J
   2/04598; B41F 23/042; B41F 23/0436;
   B41M 5/0011; B41M 5/0017; B41M
   5/0023; B41M 5/0047; B41M 7/00;
   B41M 7/0072; B41M 5/52; B41M
   5/5218; B41M 5/5227; C09D 11/36;
   C09D 11/40; C09D 11/30; C09D 11/38;
   C09D 11/32; C09D 11/322; C09D
   11/324; C09D 11/328; C09D 11/101;
   C09D 11/102; C09D 11/005; C09D
   11/54; C09D 11/52; C09D 11/106
  See application file for complete search history.

(56) References Cited

U.S. PATENT DOCUMENTS

| 9,579,922 | B2 | 2/2017 | Decoux et al. |
| 10,222,525 | B2 | 3/2019 | Nagai et al. |
| 2002/0012766 | A1* | 1/2002 | Faris ............... C09D 11/037 428/100 |
| 2002/0150698 | A1* | 10/2002 | Kawabata .......... G02B 5/201 252/299.01 |
| 2004/0155221 | A1* | 8/2004 | Hammond-Smith ............ B42D 25/364 252/299.01 |
| 2006/0119684 | A1 | 6/2006 | Mafune et al. |
| 2012/0141745 | A1* | 6/2012 | Callegari ........... C09K 19/588 423/276 |
| 2013/0029169 | A1* | 1/2013 | Hammond-Smith ............ B41M 3/008 428/411.1 |
| 2016/0264591 | A1 | 9/2016 | Urbaneja et al. |

FOREIGN PATENT DOCUMENTS

| EP | 2937402 | 10/2015 |
| JP | 2005231212 | 9/2005 |
| JP | 2006063332 | 3/2006 |
| JP | 2011195747 | 10/2011 |
| JP | 2011223520 | 11/2011 |
| JP | 2014502376 | 1/2014 |
| JP | 2016090993 | 5/2016 |
| JP | 2017502918 | 1/2017 |
| JP | 2018045210 | 3/2018 |
| TW | 201502257 | 1/2015 |
| WO | 2011069689 | 6/2011 |
| WO | 2012163778 | 12/2012 |
| WO | 2015004129 | 1/2015 |

OTHER PUBLICATIONS

"Search Report of Europe Counterpart Application", dated May 6, 2021, pp. 1-8.
"International Search Report (Form PCT/ISA/210) of PCT/JP2019/012257," dated Apr. 23, 2019, with English translation thereof, pp. 1-5.
"Written Opinion of the International Searching Authority (Form PCT/ISA/237) of PCT/JP2019/012257," dated Apr. 23, 2019, with English translation thereof, pp. 1-10.
Office Action of China Counterpart Application, with English translation thereof, dated Jun. 3, 2021, pp. 1-15.
Liao Jingli, "General Higher Education "Twelfth Five-Year" Applied Undergraduate Planning Textbook: The Art of Color Composition", Xi'an Jiaotong University Press, Nov. 2014, with English abstract, pp. 1-3.
Li Yu, "Introduction to Printing", Printing Industry Press, Jan. 2009, with English abstract, pp. 1-6.
Office Action of China Counterpart Application, with English translation thereof, dated Nov. 26, 2021, pp. 1-16.
Qian Junhao et al., "New Technologies for Special Printing", China Light Industry Press, Aug. 2001, with Partial English translation, pp. 1-2.
Office Action of China Counterpart Application, with English translation thereof, dated Mar. 22, 2022, pp. 1-23.
Shu Feng, "Digital Publishing and Pre-printing Technologies", China Railway Publishing Company, 1st edition, Dec. 2012, with Partial English translation, pp. 1-4.

* cited by examiner

IMAGE FORMING METHOD

CROSS-REFERENCE TO RELATED APPLICATIONS

This application is a continuation application of International Application No. PCT/JP2019/012257, filed Mar. 22, 2019, the disclosure of which is incorporated herein by reference in its entirety. Further, this application claims priority from Japanese Patent Application No. 2018-065139, filed Mar. 29, 2018, the disclosure of which is incorporated herein by reference in its entirety.

BACKGROUND OF THE INVENTION

1. Field of the Invention

The present invention relates to an image forming method.

2. Description of the Related Art

In recent years, image forming methods using reflective liquid crystals have been proposed. The reflective liquid crystal has a unique light reflectivity. Therefore, by forming a decorative image not seen in other image forming materials, that is, by forming a reflective cholesteric liquid crystal, it is possible to provide an image having an appearance that cannot be achieved by the conventional light-absorbing layer made of ink or the like. For example, the application of the reflective cholesteric liquid crystal enables the formation of an image having a metallic gloss, so that it can be expected to be applied to new decoration and security printing by using a liquid crystal compound.

As an image forming method applying a liquid crystal composition, a method for forming a bright image having good friction resistance by recording an ink composition containing a cholesteric liquid crystal polymer, a polymerizable compound and a photopolymerization initiator by inkjet and curing an ink image has been proposed (refer to JP2011-195747A).

In addition, as an application of the liquid crystal compound, there has been proposed an optical member that has a base material and a dot formed on the base material and having wavelength selective reflectivity, and can be disposed on a surface of an image display device, in which a liquid crystal material has high retroreflectivity in multiple directions (refer to JP2016-090993A).

SUMMARY OF THE INVENTION

However, in the method disclosed in JP2011-195747A, particles obtained by pulverizing a liquid crystal polymer are used as a colorant as a liquid crystal material, and it is difficult to prepare fine particles suitable for inkjet recording by the method of pulverizing the liquid crystal polymer, which is not suitable for the requirement of high-quality image formation.

In addition, the optical member disclosed in JP2016-090993A is a transparent screen, and it is not assumed that the reflective liquid crystal material itself is imagewisely drawn and decorated.

A problem to be solved by an embodiment of the present invention is to provide an image forming method in which a reflective liquid crystal image having a metallic gloss can be formed and color reproducibility and color density of an image to be formed can be easily adjusted.

Means for solving the problem includes the following embodiments.

<1> An image forming method including a step of imagewisely applying, onto a base material by an inkjet method, at least two inks containing a polymerizable liquid crystal compound, a chiral compound, and a polymerization initiator and having reflection wavelengths different from each other, such that the total application amount of the inks provides an image area ratio of 50% or more in an image forming region.

<2> The image forming method described in <1>, in which the at least two inks having the reflection wavelengths different from each other are inks having chiral compound contents different from each other.

<3> The image forming method described in <1> or <2>, in which the at least two inks differ from each other in at least one of the kind of polymerizable liquid crystal compound or the content of polymerizable liquid crystal compound.

<4> The image forming method described in any one of <1> to <3>, in which at least one of the at least two inks having the reflection wavelengths different from each other contains two or more polymerizable liquid crystal compounds different from each other.

<5> The image forming method described in any one of <1> to <4>, in which a density of an image to be formed is changed by changing an application amount of at least one ink.

<6> The image forming method described in any one of <1> to <5>, in which the base material is a light-absorbing base material.

<7> The image forming method described in <6>, in which a visible light absorbance of the base material is 50% or more.

According to an embodiment of the present invention, the image forming method in which a reflective liquid crystal image having a metallic gloss can be formed and color reproducibility and color density of an image to be formed can be easily adjusted can be provided.

DESCRIPTION OF THE PREFERRED EMBODIMENTS

Figure 1:
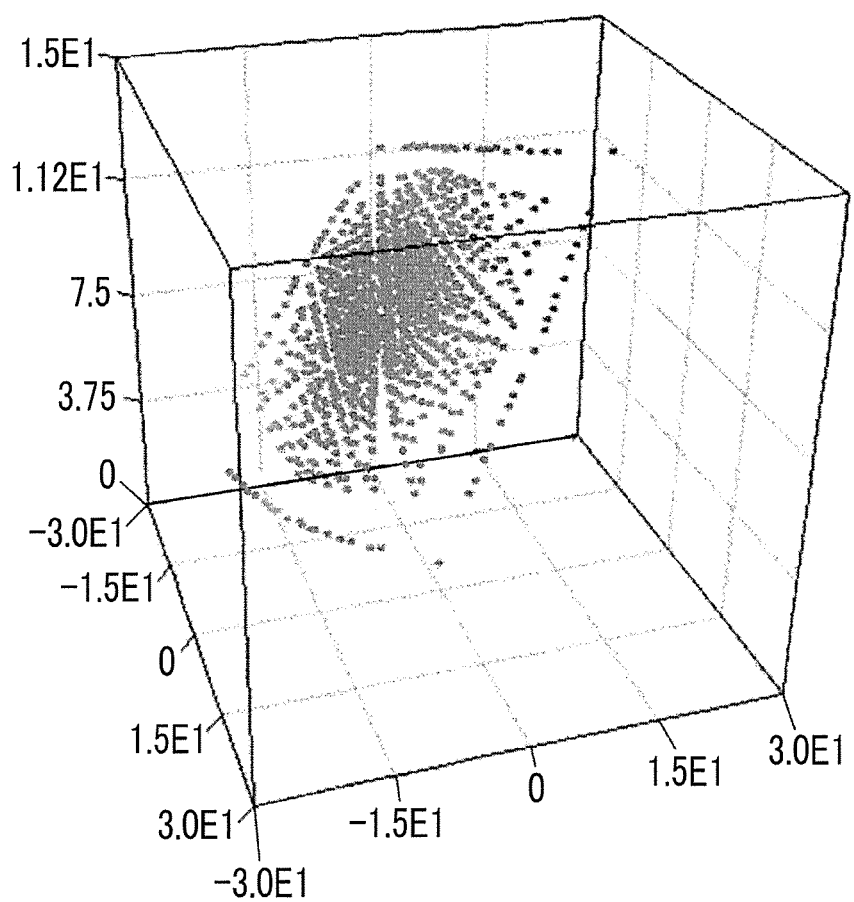
FIG. 1 is a graph showing a volume of a color reproduction region of an image obtained by an image forming method of Example 1 in a CIE L*a*b*(1976) space.

In the present disclosure, a numerical range described using "to" represents a numerical range including numerical values before and after "to" as a lower limit value and an upper limit value.

Further, in the present disclosure, the amount of each component in a composition means the total amount of a plurality of substances present in the composition, unless otherwise noted, in a case where there is the plurality of substances corresponding to each component in the composition.

In addition, the expression "substituent" is used in a meaning including unsubstituted ones and ones further having substituents, unless otherwise noted, and for example, the expression "alkyl group" is used in a meaning including both an unsubstituted alkyl group and an alkyl group further having substituents. The same applies to other substituents.

In the present disclosure, "(meth) acrylic" means at least one of acrylic or methacrylic, and "(meth) acrylate" means at least one of acrylate or methacrylate.

In the numerical range described stepwise in the present disclosure, the upper limit value or the lower limit value described in a certain numerical range may be replaced with the upper limit value or the lower limit value of another numerical range described stepwise. In addition, in the numerical range described in the present disclosure, the upper limit value or the lower limit value described in a certain numerical range may be replaced with the value shown in the embodiment.

Further, in the present disclosure, a combination of two or more preferable aspects is a more preferable aspect.

In the present disclosure, visible light indicates light in the wavelength range of 380 nm to 780 nm.

In the present disclosure, a selective reflection wavelength refers to an average value of the above two wavelengths as a wavelength that indicates half value transmittance: T ½ (%) represented by the following formula, in a case where a wavelength is obtained with a minimum value (maximum value of reflectivity) of transmittance in a target object (member) as T min (%).

The formula for calculating half value transmittance: T½=100−[(100−T min)]/2 In the present disclosure, the term "step" can be used as long as the intended purpose of step is achieved, not only as an independent step but also in a case where it cannot be clearly distinguished from other steps.

In the present disclosure, color reproducibility indicates a wide range of colors that can be visually recognized by human eyes in a case where color in a visible region is replaced with numerical values and graphed as color coordinates.

<Image Forming Method>

An image forming method includes a step of imagewisely applying, onto a base material by an inkjet method, at least two inks containing a polymerizable liquid crystal compound, a chiral compound, and a polymerization initiator and having reflection wavelengths different from each other, such that the total application amount of the inks provides an image area ratio of 50% or more in an image forming region.

Here, the image area ratio indicates the area proportion of halftone dot images (dots) formed by ink droplets (dots) in a unit area. The image area ratio can be calculated from measuring the area of non-image regions and the area of image regions in the unit area, and performing calculation from the obtained areas. As the image area ratio increases, the area of ink droplets (dot images) per unit area increases, resulting in a high-density image.

In the image forming method of the present disclosure, an image is formed by using at least two types of ink having compositions different from each other and reflected light wavelengths different from each other.

As the inks, at least two types of ink having the compositions different from each other and the reflected light wavelengths different from each other are used. Three or more types of ink having the reflected light wavelengths different from each other may be used. From the viewpoint that a wider color range of the image can be reproduced, it is preferable to use three types of ink.

The image formed by the ink consists of a cholesteric liquid crystal layer which is a cured product of the ink and has a cholesteric structure. That is, the image formed by the ink consists of a cholesteric liquid crystal layer having a cholesteric structure formed by including a cholesteric liquid crystalline phase whose revolution direction is adjusted by using a polymerizable liquid crystal compound.

(Cholesteric Structure)

The cholesteric structure is known to indicate selective reflectivity at specific wavelengths. A center wavelength $\lambda$ of selective reflection depends on a pitch P (=spiral period) of a spiral structure in the cholesteric structure, and follows a relationship of an average refractive index n of the cholesteric liquid crystal and $\lambda = n \times P$.

Therefore, the selective reflection wavelength can be adjusted by adjusting the pitch of the spiral structure. The pitch of the cholesteric structure depends on a type of the polymerizable liquid crystal compound and the chiral compound used together, or an addition density of the chiral compound in a case of forming the dots. Therefore, a desired pitch, that is, a desired selective reflectivity can be obtained by adjusting at least one of the type or the addition density of the chiral compound. It should be noted that the preparation of the pitch is described in detail in FUJIFILM Research Report No. 50 (2005) p. 60 to 63. As measurement methods for a sense and pitch of the spiral, it is possible to use the method described on page 46 of "Liquid Crystal Chemical Experiment Introduction" Japan Liquid Crystal Society published by Sigma Corporation in 2007, and page 196 of "Liquid Crystal Handbook" Liquid Crystal Handbook Editing Committee, Maruzen.

The cholesteric structure gives a striped pattern of a bright portion and a dark portion in the cross-sectional view of the dots observed by a scanning electron microscope (SEM). Two repetitions of the bright portion and the dark portion (two bright portions and two dark portions) correspond to one spiral pitch. From this, the pitch of the spiral structure can be measured from the SEM cross-sectional view. A normal line of each line of the striped pattern is a spiral axis direction.

It should be noted that the reflected light of the cholesteric structure is circular polarization. Therefore, in the image forming method of the present disclosure, the reflected light of the dots imagewisely applied on the base material becomes the circular polarization. In the image formed by the image forming method of the present disclosure, a reflected light wavelength, that is, a color tone of the image that can be visually confirmed can be selected in consideration of circularly polarized light selective reflectivity. Whether the reflected light is right-circular polarization or left-circular polarization, the cholesteric structure depends on a twisted direction of the spiral. The selective reflection by the cholesteric liquid crystal reflects the right-circular polarization in a case where the twisted direction of the spiral of the cholesteric liquid crystal is right, and reflects the left-circular polarization in a case where the twisted direction of the spiral of the cholesteric liquid crystal is left.

The dots constituting the image may be configured by the cholesteric liquid crystal whose twisted direction of the spiral is either right or left. It is also preferable that the direction of the circular polarization in the dots constituting the image is selected to be the same as a direction of circular polarization of light radiated from light sources used in combination.

It should be noted that the revolution direction of the polymerizable liquid crystal compound in the cholesteric liquid crystalline phase can be adjusted by the type of the liquid crystal compound and the type or amount of the added chiral compound.

A color tone adjustment of the ink in the present disclosure is preferably performed by adjusting the amount of the chiral compound.

A half-width $\Delta\lambda$ (nm) of a selective reflection band (circular polarization reflection band) showing the selective reflection follows a relationship of $\Delta\lambda=\Delta n \times P$, in which $\Delta\lambda$ depends on a birefringence $\Delta n$ and the pitch P of the liquid crystal compound. Therefore, the width of the selective reflection band can be controlled by adjusting $\Delta n$. The $\Delta n$ can be adjusted by adjusting the type of the polymerizable liquid crystal compound and a mixing ratio thereof, or by controlling temperature at the time of fixing an alignment. The half-width of the reflection wavelength band is adjusted according to the image to be formed.

(Cholesteric Structure in Dots)

It is preferable that an angle between a normal line of a line formed by the first dark portion from a surface of the dots opposite to the substrate and the surface is in a range of 70° to 90° for the dots constituting the image, in a case where an inclined portion or a curved surface portion is confirmed by the cross-sectional view observed by a scanning electron microscope (SEM). In the above measurement, the dots constituting the image may have the angle between the normal line direction of the line formed by the first dark portion from the surface of the dots opposite to the substrate and the surface in the range of 70° to 90° at all points of the inclined portion or the curved surface portion. That is, it is preferable that a portion of the inclined portion or the curved surface portion satisfies the angle, for example, a portion of the inclined portion or the curved surface portion does not intermittently satisfy the angle, but continuously satisfies the angle.

It should be noted that in a case where a surface is curved in the cross-sectional view, the angle formed by the surface means an angle from a tangent line of the surface. In addition, the angle is shown as an acute angle, and means the range of 70° to 110° in a case where the angle between the normal line and the surface is represented as an angle of 0° to 180°. In the cross-sectional view, it is preferable that the angle between the normal line of each line formed by the second dark portion from the surface of the dots opposite side to the substrate and the surface is in the range of 70° to 90°, and it is more preferable that the angle between the normal line of each line formed by the third and fourth dark portions from the surface of the dots opposite side to the substrate and the surface is in the range of 70° to 90°. Additionally, it is further preferable that the angle between the normal line of each line formed by the fifth to twelfth or more dark portions from the surface of the dots opposite to the substrate and the surface is in the range of 70° to 90°.

The angle is preferably in the range of 80° to 90°, more preferably in the range of 85° to 90°.

The cross-sectional view observed by SEM shows that a spiral axis of the cholesteric structure forms an angle in the range of 70° to 90° with the surface of the dots of the above-described inclined portion or curved surface portion. According to such a structure, light incident on the dots can be incident on light incident from a direction forming an angle from the normal direction of the substrate at an angle close to parallel to the spiral axis direction of the cholesteric structure in the inclined portion or the curved surface portion. Therefore, in a case where the spiral axis of the cholesteric structure forms the angle in the range of 70° to 90° with the surface of the dots, the light incident on the dot can be reflected in various directions. For example, it is preferable that the light incident on the dots from the normal direction of the substrate can be reflected in all directions on the surface of the dot. By reflecting the light incident on the dots in various directions, it is particularly preferable that an angle (half-value angle) at which half brightness of the front surface brightness (peak brightness) can be achieved can be set to 35° or more, and high reflectivity is achieved.

On the surface of the dots of the inclined portion or curved surface portion, the spiral axis of the cholesteric structure forms the angle in the range of 70° to 90° with the surface, so that it is preferable that the angle between the normal direction of the line formed by the first dark portion from the surface and the normal direction of the substrate continuously decreases as the height continuously increases.

It should be noted that the cross-sectional view is a cross-sectional view in any direction including a portion having the height continuously increasing to the maximum height in the direction from an end portion of the dots toward the center, and may typically be a cross-sectional view of any surface perpendicular to the substrate including the center of the dots.

(Inks)

The inks used in the present disclosure will be described.

The inks are prepared as inkjet recording inks each containing a polymerizable liquid crystal compound, a chiral compound, and a polymerization initiator.

The inks according to the present disclosure contain the polymerizable liquid crystal compound, the chiral compound, and the polymerization initiator. In a case where the inks contain the polymerizable liquid crystal compound and the inks are applied onto the base material and cured, an image including the liquid crystal compound and having excellent selective reflectivity is formed.

In a case where the inks contain the polymerizable liquid crystal compound, the inks containing an uncured polymerizable liquid crystal compound have a good jettability and a jetting amount thereof can be easily controlled unlike a case of using, for example, a liquid crystal polymer.

In the polymerizable liquid crystal compound, the wavelength of the reflected light obtained can be controlled by the type, an addition amount, and the like of the chiral compound used in combination.

The inks according to the present disclosure can easily obtain inks having desired color tones by controlling the addition amount of the included chiral compound. That is, it is preferable that the at least two inks having the reflection wavelengths different from each other in the present disclosure are inks having chiral compound contents different from each other.

In addition, as another aspect of the at least two inks having the reflection wavelengths different from each other, the at least two inks may differ from each other in at least one of the kind of polymerizable liquid crystal compound or the content of polymerizable liquid crystal compound.

In the image forming method of the present disclosure, an image is formed by using at least two or more types of ink having compositions different from each other and reflected light wavelengths different from each other. As described above, at the time of image formation, the image may be formed by using three or more kinds of ink having compositions providing reflected light wavelengths different from each other, and it is preferable to form the image by using three kinds of ink having compositions providing reflected light wavelengths different from each other.

—Polymerizable Liquid Crystal Compound—

The polymerizable liquid crystal compound in the present disclosure will be described.

The polymerizable liquid crystal compound may be a rod-shaped liquid crystal compound or a discotic liquid crystal compound, but is preferably the rod-shaped liquid crystal compound.

An example of a rod-shaped polymerizable liquid crystal compound forming the cholesteric liquid crystal layer includes a rod-shaped nematic liquid crystal compound. Azomethines, azoxys, cyanobiphenyls, cyanophenyl esters, benzoic esters, cyclohexane carboxylic acid phenyl esters, cyanophenylcyclohexanes, cyano-substituted phenylpyrimidines, alkoxy-substituted phenylpyrimidines, phenyldioxanes, tolans, and alkenylcyclohexyl benzonitriles are preferably used as the rod-shaped nematic liquid crystal compound. Not only a low molecular weight liquid crystal compound but also a high molecular weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group, and the unsaturated polymerizable group is preferable, and an ethylenically unsaturated polymerizable group is particularly preferable. The polymerizable group can be introduced into the molecule of the liquid crystal compound by various methods. The number of polymerizable groups having in the polymerizable liquid crystal compound is preferably 1 to 6, and more preferably 1 to 3. From the viewpoint of durability of the obtained image, the polymerizable liquid crystal compound more preferably has two polymerizable groups in the molecule.

Polymerizable liquid crystal compounds include the compounds described in Makromol. Chem., Vol. 190, p. 2255 (1989), Advanced Materials Vol. 5, p. 107 (1993), U.S. Pat. Nos. 4,683,327A, 5,622,648A, 5,770,107A, WO95/022586A, WO95/024455A, WO97/000600A, WO98/023580A, WO98/052905A, JP1989-272551A (JP-H01-272551A), JP 1994-016616A (JP-H06-016616A), JP1995-110469A (JP-H07-110469A), JP1999-080081A (JP-H11-080081A), and JP2001-328973A.

The polymerizable liquid crystal compound included in the polymerizable composition may be one type or two or more types.

Among them, it is preferable that at least one of the at least two inks having the reflection wavelengths different from each other contains two or more polymerizable liquid crystal compounds different from each other.

By using two or more kinds of polymerizable liquid crystal compounds, it becomes easier to obtain a wide color reproduction range in the image forming method of the present disclosure.

Specific examples of the polymerizable liquid crystal compound include compounds shown by the following formulas (1) to (11). It should be noted that polymerizable liquid crystal compounds that can be used in the inks are not limited to the following examples.

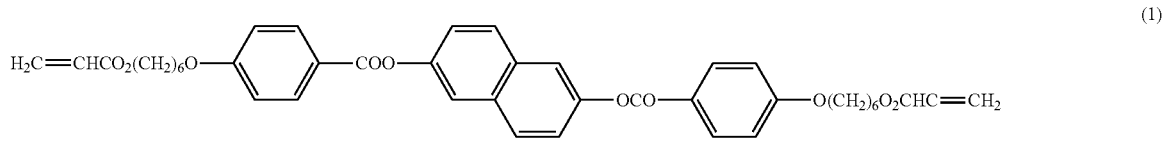

(1)

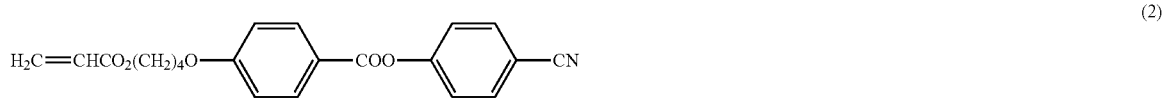

(2)

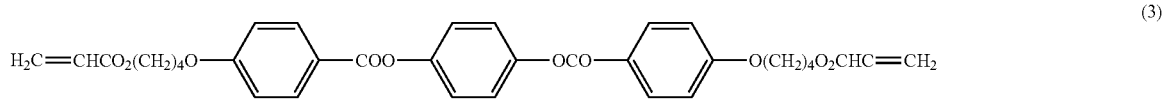

(3)

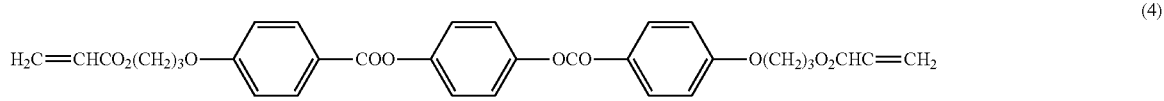

(4)

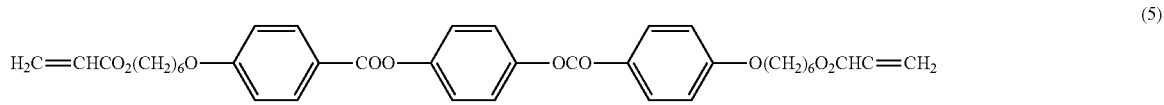

(5)

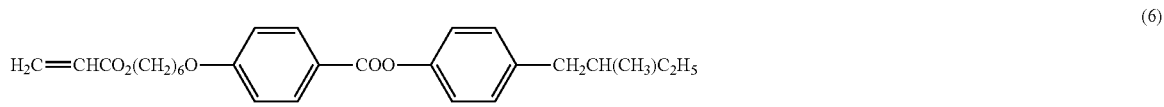

(6)

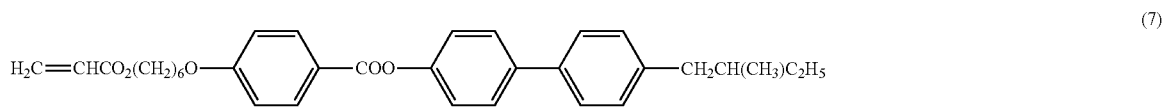

(7)

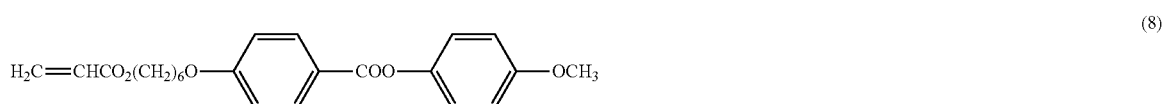

(8)

(9)
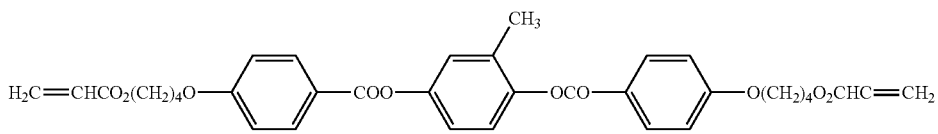
(10)
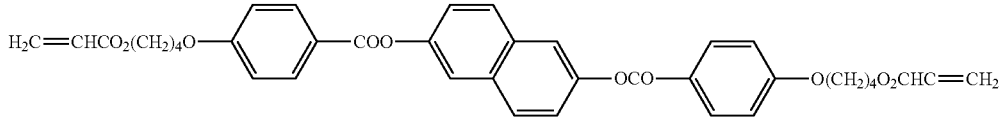
(11)
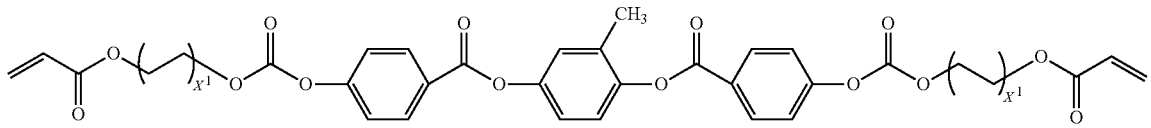
In the above-described compound (11), each $X^1$ independently represents an integer of 2 to 5.
(12)
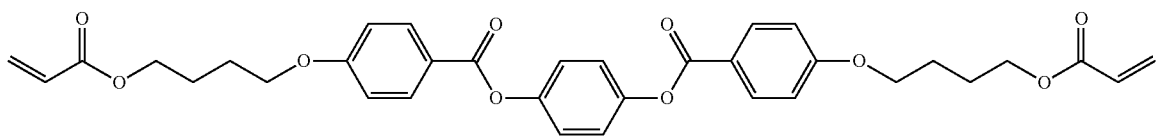
(13)
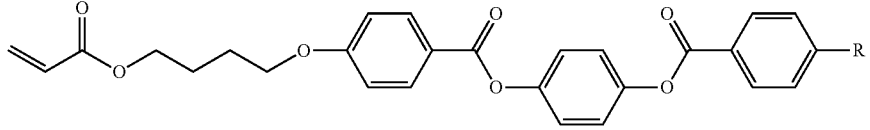
(14)
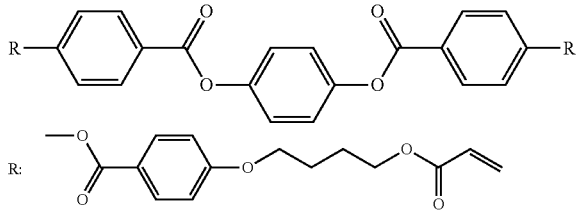
In the above-exemplified compounds (13) and (14), R is a group which bonds with oxygen. For example, a partial structure exemplified as R is bonded to R of the exemplified compound (13), and the exemplified compound (13) has the following structure.
(13)
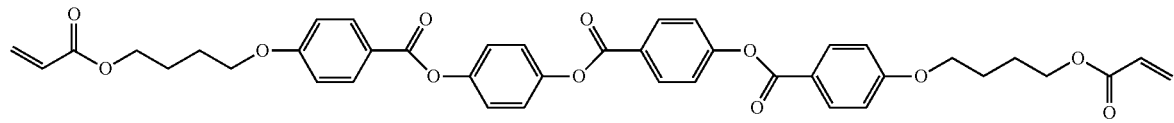
(15)
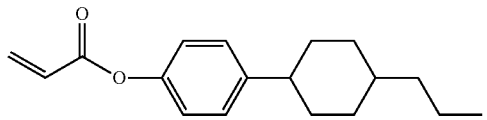

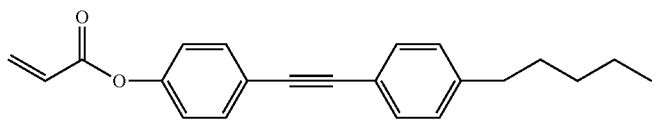

(16)

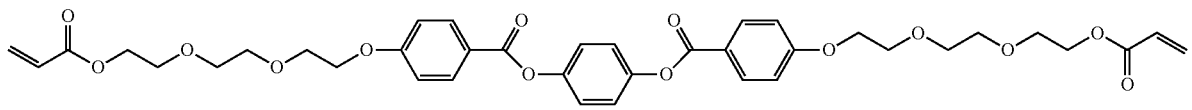

(17)

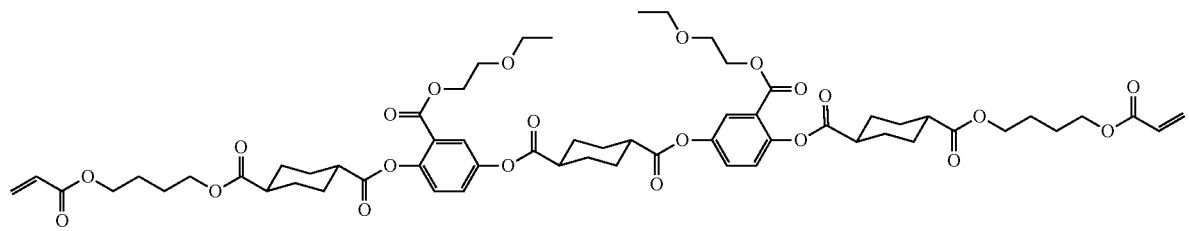

(18)

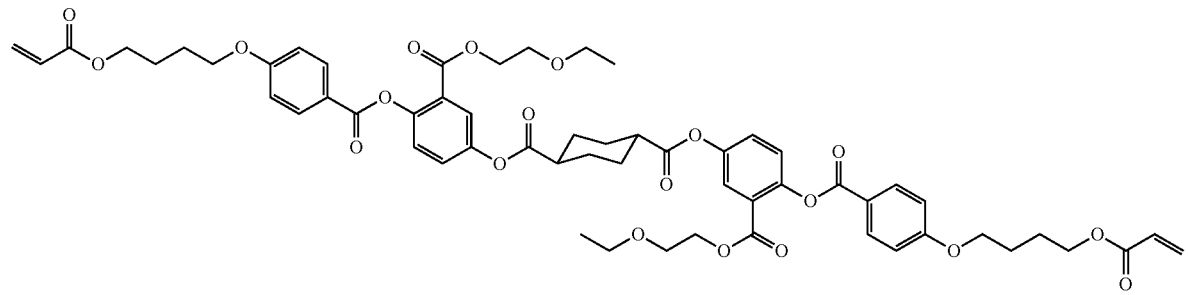

(19)

It should be noted that examples of the polymerizable liquid crystal compound other than those exemplified above include a cyclic organopolysiloxane compound having a cholesteric phase as disclosed in JP1982-165480A (JP-S57-165480A).

In addition, the addition amount of the polymerizable liquid crystal compound in each ink is preferably 1% by mass to 70% by mass, more preferably 5% by mass to 50% by mass, and further more preferably 10% by mass to 30% by mass with respect to a solid content mass of the ink, that is, a mass of the ink excluding a solvent from a total mass of the ink.

—Chiral Compound—

A chiral compound is also called an optically active compound.

The chiral compound has a function of inducing the spiral structure of the polymerizable liquid crystal compound in the cholesteric liquid crystalline phase. The chiral compound may be selected according to the purpose since the twisted direction or the spiral pitch of the spiral induced by the compound is different.

The chiral compound is not particularly limited, and known compounds (for example, compounds disclosed in the Liquid Crystal Device Handbook, chapter 3, section 4-3, chiral agents for TN and STN, page 199, Japan Society for the Promotion of Science, Committee 142, 1989), isosorbide, and isomannide derivatives can be used.

The chiral compound generally includes an asymmetric carbon atom, but an axial asymmetric compound or a planar asymmetric compound that does not include the asymmetric carbon atom can also be used as the chiral compound. Examples of the axial asymmetric compound or the planar asymmetric compound include binaphthyl, helicene, paracyclophane, and derivatives thereof.

The chiral compound may have the polymerizable group. In a case where the chiral compound used in a combination with the polymerizable liquid crystal compound has the polymerizable group, a polymer having a repeating unit derived from the polymerizable liquid crystal compound and a repeating unit derived from the chiral compound can be formed by a polymerization reaction between a polymerizable chiral compound and the polymerizable liquid crystal compound. In this aspect, the polymerizable group included in the polymerizable chiral compound is preferably the same type of group as the polymerizable group included in the polymerizable liquid crystal compound. Accordingly, the polymerizable group of the chiral compound is preferably the unsaturated polymerizable group, the epoxy group or the aziridinyl group, more preferably an unsaturated polymerizable group, and particularly preferably an ethylenically unsaturated polymerizable group, which are listed as preferred compounds in the above-described polymerizable liquid crystal compound.

In addition, the chiral compound itself may be the liquid crystal compound.

In a case where the chiral compound has a photoisomerizable group, it is preferable because a pattern of a desired reflection wavelength corresponding to an emission wavelength can be formed by photo mask irradiation such as an active ray after coating and alignment. The photoisomerizable group is preferably an isomerization site of a compound indicating photochromic properties, an azo, an azoxy or a cinnamoyl group. As specific compounds, compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A can be used.

As specific examples of the chiral compound, the compounds shown below are exemplified. However, it is not limited to the compounds shown below.

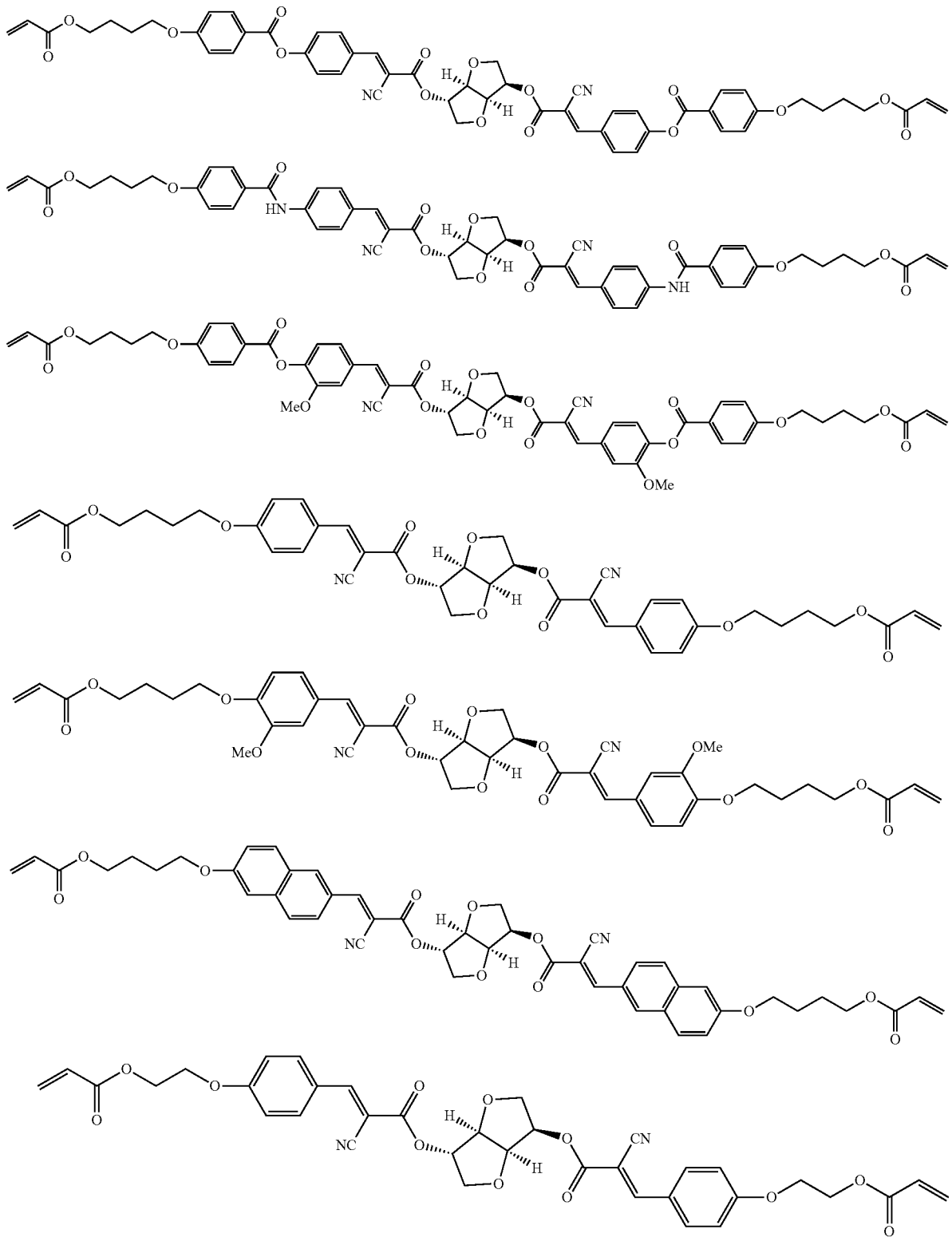

-continued
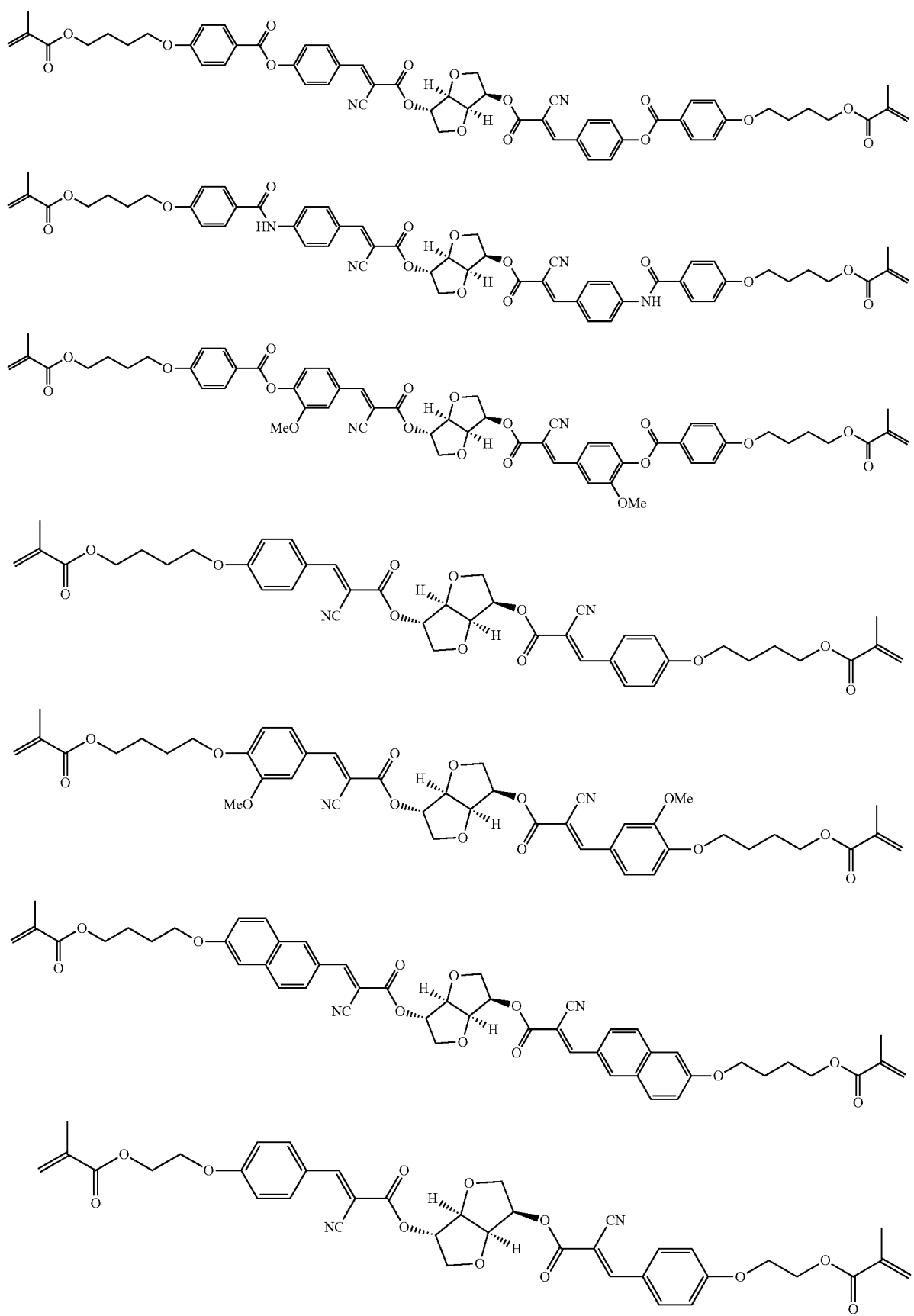

-continued

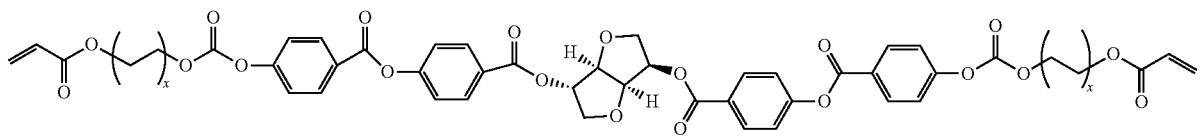
(20)

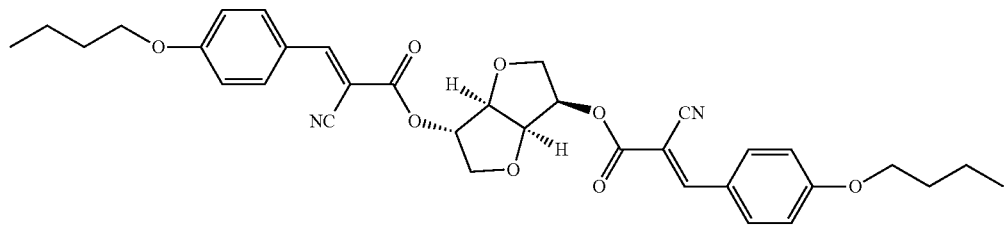
(21)

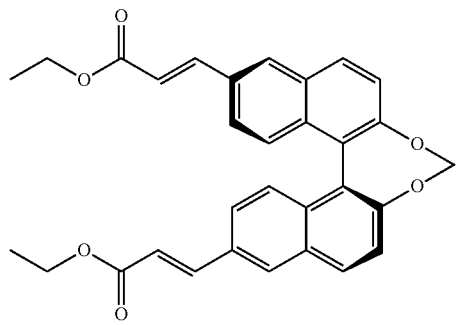
(22)

In the exemplified compound (20), each X independently represents an integer of 2 to 5.

The content of the chiral compound in each ink is preferably 1 mol % to 20 mol % and more preferably 2 mol % to 15 mol % with respect to the total amount of the polymerizable liquid crystal compounds.

In a case where the same polymerizable liquid crystal compound is used, the reflection wavelength is changed by the addition amount of the chiral compound due to the function of inducing the spiral structure of the polymerizable liquid crystal compound in the cholesteric liquid crystalline phase of the chiral compound. By utilizing this function, it is possible to obtain inks of two or more different color tones by using the same polymerizable liquid crystal compound and changing the addition amount of the chiral compound.

The content of the chiral compound can be appropriately selected according to the type of the polymerizable liquid crystal compound used in combination.

Generally, it is appropriately selected within the range of 3 to 10 parts by mass with respect to 100 parts by mass of the polymerizable liquid crystal compound used in combination.

According to some aspects, for a single polymerizable liquid crystal compound, the higher content of the chiral compound tends to shift the reflection wavelength toward the short-wavelength side, and the lower content of the chiral compound tends to shift the reflection wavelength toward the long-wavelength side.

—Polymerization Initiator—

Each ink contains a polymerization initiator. The polymerization initiator is preferably a photopolymerization initiator, and more preferably a photopolymerization initiator for advancing the polymerization reaction by ultraviolet irradiation.

Examples of photopolymerization initiators include α-carbonyl compounds (disclosure in U.S. Pat. Nos. 2,367,661A and 2,367,670A), acyloin ethers (disclosure in U.S. Pat. No. 2,448,828A), α-hydrocarbon-substituted aromatic acyloin compounds (disclosure in U.S. Pat. No. 2,722,512A), polynuclear quinone compounds (disclosure in U.S. Pat. Nos. 3,046,127A and 2,951,758A), combinations of triarylimidazole dimers with p-aminophenyl ketones (disclosure in U.S. Pat. No. 3,549,367A), acridines and phenazine compounds (disclosure in JP1985-105667A (JP-S60-105667A), U.S. Pat. No. 4,239,850A) and oxadiazole compounds (disclosure in U.S. Pat. No. 4,212,970A).

The content of the photopolymerization initiator in the ink is preferably 0.1% by mass to 20% by mass with respect to the total content of the polymerizable liquid crystal compound included in the ink, more preferably 0.5% by mass to 12% by mass.

—Other Additives—

The inks according to the present disclosure are applied to the inkjet method.

In addition to the polymerizable liquid crystal compound, the chiral compound and the polymerizable liquid crystal compound, each ink can contain an additive (may be referred to as other additives) contained in an ink to be applied to the inkjet method, as necessary, within a range that does not impair the effect.

Other additives include surfactants, solvents, polymerizable monomers, cross-linking agents, non-polymerizable polymers, non-polymerizable oligomers, polymerizable oligomers, and the like for improving ink jettability.

—Surfactant—

Each ink used for forming an image may contain a surfactant.

By adding the surfactant, the polymerizable liquid crystal compound is aligned horizontally on an air interface side during dot formation, and dots in which the spiral axis direction is more controlled can be obtained.

Generally, in order to form dots, it is necessary not to reduce the surface tension of the liquid droplets in order to maintain a liquid droplet shape during printing. However, according to the study of the inventors of the present invention, it has been found that the inks in the present disclosure can form dots even in a case where a surfactant is added, and further, by adding the surfactant at the time of forming the dots, a contact angle between the dots and the substrate can be formed in an angle range that can achieve both a wide viewing angle and high transparency.

The surfactant is preferably a compound capable of functioning as an alignment control agent that contributes to stably or rapidly forming a cholesteric structure having a planar alignment. Examples of the surfactant include a silicone-based surfactant and a fluorine-based surfactant, and the fluorine-based surfactant is preferable.

Specific examples of surfactants include compounds disclosed in [0082] to [0090] of JP2014-119605A, compounds disclosed in paragraphs [0031] to [0034] of JP2012-203237A, compounds exemplified in [0092] and [0093] of JP2005-099248A, compounds exemplified in [0076] to [0078] and [0082] to [0085] of JP2002-129162A, and fluorine (meth) acrylate-based polymers disclosed in paragraphs [0018] to [0043], and the like of JP2007-272185A.

It should be noted that the surfactant as a horizontal alignment agent may use one kind, or may use two or more.

As the fluorine-based surfactant, compounds represented by the following general formula (I) disclosed in [0082] to [0090] of JP2014-119605A are particularly preferable.

General Formula (I)

In general formula (I), each of $L^{11}$, $L^{12}$, $L^{13}$, $L^{14}$, $L^{15}$, and $L^{16}$ independently represents a single bond, —O—, —S—, —CO—, —COO—, —OCO—, —COS—, —SCO—, —NRCO—, or —CONR— (R in the general formula (I) represents a hydrogen atom or an alkyl group having 1 to 6 carbon atoms). Among them, —NRCO—, —CONR— have an effect of reducing solubility, and from the viewpoint of having a tendency that a haze increases at the time of producing dots, more preferred are —O—, —S—, —CO—, —COO—, —OCO—, —COS—, —SCO—, and from the viewpoint of compound stability, further more preferred are —O— and —CO—, —COO—, and —OCO—. The alkyl group which can be taken by R may be linear or branched. The number of carbon is more preferably 1 to 3, and examples thereof include a methyl group, an ethyl group, and an n-propyl group.

Each of $Sp^{11}$, $Sp^{12}$, $Sp^{13}$, and $Sp^{14}$ independently represents a single bond or an alkylene group having 1 to 10 carbon atoms, more preferably a single bond or an alkylene group having 1 to 7 carbon atoms, and further more preferably a single bond or an alkylene group having 1 to 4 carbon atoms. However, the hydrogen atom of the alkylene group may be substituted with a fluorine atom. The alkylene group may be branched or unbranched, but preferred is an unbranched straight chain alkylene group. From the viewpoint of synthesis, it is preferable that $Sp^{11}$ and $Sp^{14}$ are the same and that $Sp^{12}$ and $Sp^{13}$ are the same.

Each of $A^{11}$ and $A^{12}$ is independently a monovalent to tetravalent aromatic hydrocarbon group. The number of carbon atoms of the aromatic hydrocarbon group is preferably 6 to 22, more preferably 6 to 14, still more preferably 6 to 10, and further more preferably 6. The aromatic hydrocarbon group represented by $A^{11}$ and $A^{12}$ may have a substituent. Examples of such a substituent can include an alkyl group having 1 to 8 carbon atoms, an alkoxy group, a halogen atom, a cyano group or an ester group. Examples of the substituent for the aromatic hydrocarbon group represented by $A^{11}$ and $A^{12}$ can include a methyl group, an ethyl group, a methoxy group, an ethoxy group, a bromine atom, a chlorine atom, and a cyano group. Since a molecule having a large number of perfluoroalkyl moieties in the molecule can align the liquid crystal with a small addition amount, which leads to a decrease in the haze, from the viewpoint that a large number of perfluoroalkyl groups can be contained in the molecule, $A^{11}$ and $A^{12}$ are preferably tetravalent. From the viewpoint of synthesis, $A^{11}$ and $A^{12}$ are preferably the same.

In general formula (I), $T^{11}$ preferably represents a divalent group or a divalent aromatic heterocyclic group shown below.

In the formula, X represents the alkyl group having 1 to 8 carbon atoms, the alkoxy group, the halogen atom, the cyano group or the ester group, and each of Ya, Yb, Yc and Yd independently represents a hydrogen atom or an alkyl group having 1 to 4 carbon atoms.

In the formula, o and p shows the number of substituents X in a ring structure, and each of them independently represents an integer of 0 or more.

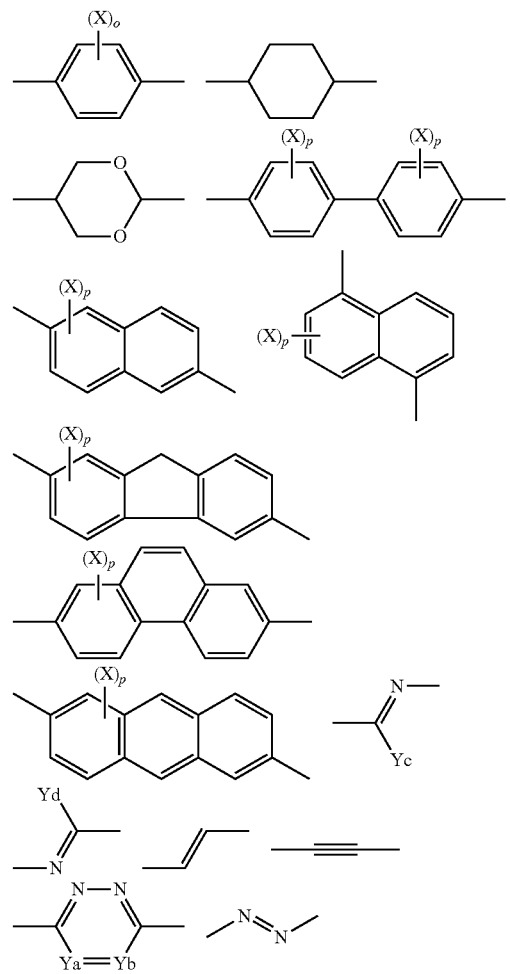

$T^{11}$ more preferably represents a divalent group or a divalent aromatic heterocyclic group shown below.

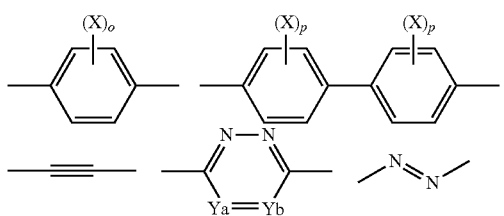

$T^{11}$ further more preferably represents a divalent group or a divalent aromatic heterocyclic group shown below.

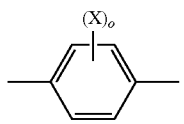

The alkyl group which can be taken by X included in $T^{11}$ has 1 to 8 carbon atoms, preferably 1 to 5, and more preferably 1 to 3. The alkyl group may be linear, branched or cyclic, and is preferably linear or branched.

Examples of the preferable alkyl group can include a methyl group, an ethyl group, an n-propyl group, an isopropyl group and the like, and among them, the methyl group is preferable. For alkyl moieties of the alkoxy group which can betaken by X included in $T^{11}$, the description and the preferred range of the alkyl group which can be taken by X included in $T^{11}$ can be referred to.

Examples of the halogen atom which can be taken by X included in $T^{11}$ can include a fluorine atom, a chlorine atom, a bromine atom, and an iodine atom, and an atom selected from the chlorine atom and the bromine atom is preferable. Examples of the ester group which can be taken by X included in $T^{11}$ can include a group represented by R'COO—. Examples of R' can include the alkyl group having 1 to 8 carbon atoms. For the description and the preferred range of the alkyl group which can be taken by R', the description and the preferred range of the alkyl group which can be taken by X included in $T^{11}$ can be referred to. Specific examples of the ester can include $CH_3COO$— and $C_2H_5COO$—.

The alkyl group having 1 to 4 carbon atoms which can be independently taken by each of Ya, Yb, Yc, and Yd may be linear or branched. Examples of the alkyl group having 1 to 4 carbon atoms can include a methyl group, an ethyl group, an n-propyl group, and an isopropyl group.

The divalent aromatic heterocyclic group preferably has a 5-membered, 6-membered or 7-membered heterocyclic ring. The 5-membered ring or a 6-membered ring is more preferable, and the 6-membered ring is further preferable. As a hetero atom constituting the heterocyclic ring, an atom selected from a nitrogen atom, an oxygen atom and a sulfur atom is preferable. The hetero ring is preferably an aromatic heterocyclic ring. The aromatic heterocyclic ring is generally an unsaturated heterocyclic ring. The unsaturated heterocyclic ring having the most double bonds is more preferable.

Examples of heterocyclic rings include furan rings, thiophene rings, pyrrole rings, pyrroline rings, pyrrolidine rings, oxazole rings, isoxazole rings, thiazole rings, isothiazole rings, imidazole rings, imidazoline rings, imidazolidine rings, pyrazole rings, pyrazoline rings, pyrazolidine rings, triazole rings, furazan rings, tetrazole rings, pyran rings, thiin rings, pyridine rings, piperidine rings, oxazine rings, morpholine rings, thiazine rings, pyridazine rings, pyrimidine rings, pyrazine rings, piperazine rings, and triazine rings.

The divalent heterocyclic group may have a substituent. For the description of examples and the preferred range of the substituent that can be introduced into the divalent heterocyclic group, the description and the description regarding the substituent that can be contained by the monovalent to tetravalent aromatic hydrocarbon of $A^1$ and $A^2$ can be referred to.

Each $Hb^{11}$ independently represents perfluoroalkyl groups having 2 to 30 carbon atoms, more preferably perfluoroalkyl groups having 3 to 20 carbon atoms, and further more preferably perfluoroalkyl groups having 3 to 10 carbon atoms. The perfluoroalkyl group may be linear, branched or cyclic. The perfluoroalkyl group is preferably linear or branched, and more preferably linear.

Each of m11 and n11 is independently 0 to 3 and m11+n11≥1. At this time, the plurality of structures in the parentheses may be the same or different from each other, but the plurality of structures are preferably the same. m11 and n11 of the general formula (I) are determined by valences of $A^{11}$ and $A^{12}$, and the preferable range is also determined by the preferable range of the valences of $A^{11}$ and $A^{12}$.

Each of o and p included in $T^{11}$ is independently an integer of 0 or more, and in a case where o and p are 2 or more, a plurality of Xs may be the same as or different from each other. It is preferable that o included in $T^{11}$ is 1 or 2. p included in $T^{11}$ is preferably an integer of 1 to 4, and more preferably 1 or 2.

The compound represented by general formula (I) may or may not have symmetry in molecular structure. It should be noted that the "symmetry" means at least one of point symmetry, line symmetry, or rotational symmetry, and "asymmetry" means none of point symmetry, line symmetry, and rotational symmetry.

The compound represented by the general formula (I) is a compound in which the above-mentioned perfluoroalkyl group ($Hb^{11}$), a linking group -(-$Sp^{11}$-$L^{11}$-$Sp^{12}$-$L^{12}$) $m_{11}$-$A^{11}$-$L^{13}$- and -$L^{14}$-$A^{12}$-($L^{15}$-$Sp^{13}$-$L^{16}$-$Sp^{14}$-)$n_{11}$-, and preferably T which is a divalent group having an excluded volume effect are combined. The two perfluoroalkyl groups ($Hb^{11}$) present in the molecule are preferably the same as each other, and the linking group -(-$Sp^{11}$-$L^{11}$-$Sp^{12}$-$L^{12}$)$m_{11}$-$A^{11}$-$L^{13}$- and -$L^{14}$-$A^{12}$-($L^{15}$-$Sp^{13}$-$L^{16}$-$Sp^{14}$-)$n_{11}$- present in the molecule are also preferably the same. A terminal $Hb^{11}$-$Sp^{11}$-$L^{11}$-$Sp^{12}$- and -$Sp^{13}$-$L^{16}$$Sp^{14}$-$Hb^{11}$ are preferably groups represented by any of the following general formulas.

  Formula (a1)

  Formula (a2)

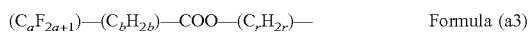  Formula (a3)

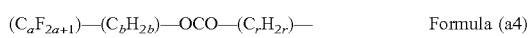  Formula (a4)

In the above formulas (a1), (a2), (a3), and (a4), a is preferably 2 to 30, more preferably 3 to 20, and further preferably 3 to 10. b is preferably 0 to 20, more preferably 0 to 10, and further preferably 0 to 5. a+b is 3 to 30. r is preferably 1 to 10, and more preferably 1 to 4.

In addition, the terminal $Hb^{11}$-$Sp^{11}$-$L^{11}$-$Sp^{12}$-$L^{12}$ and -$L^{15}$-$Sp^{13}$-$L^{16}$-$Sp^{14}$-$Hb^{11}$ in the general formula (I) are preferably groups represented by any of the following general formulas.

$$(C_aF_{2a+1})-(C_bH_{2b})-O- \quad \text{Formula (b1)}$$

$$(C_aF_{2a+1})-(C_bH_{2b})-COO- \quad \text{Formula (b2)}$$

$$(C_aF_{2a+1})-(C_bH_{2b})-O-(C_rH_{2r})-O- \quad \text{Formula (b3)}$$

$$(C_aF_{2+1})-(C_bH_{2b})-COO-(C_rH_{2r})-COO- \quad \text{Formula (b4)}$$

$$(C_aF_{2a+1})-(C_bH_{2b})-OCO-(C_rH_{2r})-COO- \quad \text{Formula (b5)}$$

The definitions of a, b and r in the above formulas (b1), (b2), (b3), (b4), and (b5) are the same as the definitions of a, b and r in the formulas (a1), (a2), (a3) and (a4) described directly above.

In a case where any of the inks contains the surfactant, the preferable content of the surfactant is preferably from 0.01% by mass to 10% by mass, more preferably from 0.01% by mass to 5% by mass, and further more preferably from 0.02% by mass to 1% by mass with respect to the total mass of the polymerizable liquid crystal compound.

—Cross-Linking Agent—

The inks according to the present disclosure may optionally contain a cross-linking agent in order to improve the film hardness after curing and the durability. As the cross-linking agent, one that can be cured by ultraviolet rays, heat, moisture or the like can be preferably used.

The cross-linking agent is not particularly limited and can be appropriately selected according to the purpose. For example, the crosslinking agent contains polyfunctional acrylate compounds such as trimethylolpropane tri (meth) acrylate or pentaerythritol tri (meth) acrylate; epoxy compounds such as glycidyl (meth) acrylate and ethylene glycol diglycidyl ether, aziridine compounds such as 2,2-bishydroxymethylbutanol-tris [3-(1-aziridinyl) propionate], 4,4-bis (ethyleneiminocarbonylamino) diphenylmethane; isocyanate compounds such as hexamethylene diisocyanate and biuret type isocyanate; polyoxazoline compounds having oxazoline group in side chain; alkoxysilane compounds such as vinyltrimethoxysilane and N-(2-aminoethyl) 3-aminopropyltrimethoxysilane. In addition, a known catalyst can be used depending on the reactivity of the cross-linking agent, and the use of the cross-linking agent can further improve the productivity in addition to the improvement of the film hardness and the durability. These may be used alone or in a combination of two or more.

In a case where any of the inks contain the cross-linking agent, the content of the crosslinking agent is preferably 3% by mass to 20% by mass, and more preferably 5% by mass to 15% by mass with respect to the total mass of the polymerizable liquid crystal compound. In a case where the content of the cross-linking agent is 3% by mass or more, the effect of improving the cross-linking density is sufficiently obtained, and in a case where it is 20% by mass or less, the stability of the cholesteric liquid crystal layer as an ink image is maintained.

—Polymerizable Monomer—

The inks may contain the polymerizable monomer in order to obtain ink physical properties such as jettability that are generally required.

Examples of the polymerizable monomer include 2-methoxyethyl acrylate, isobutyl acrylate, isooctyl acrylate, isodecyl acrylate, octyl/decyl acrylate, and the like.

As the polymerizable monomer, a monofunctional monomer is preferable from the viewpoint that the formed spiral structure can be favorably maintained even after the polymerization.

—Solvent—

The inks can contain a solvent.

The solvent that can be used is not particularly limited and can be appropriately selected according to the purpose. Among these, organic solvents are preferably used.

Examples of the organic solvents include ketone solvents such as methyl ethyl ketone and methyl isobutyl ketone, alkyl halide solvents, amide solvents, sulfoxide solvents, heterocyclic compounds, hydrocarbon solvents, ester solvents, and ether solvents. It should be noted that the term "AA solvents" is used herein to mean a group of solvents including a partial structure of "AA" in the molecule.

Among these, ketone solvents are preferable in consideration of environmental load. In addition, components such as the monofunctional polymerizable monomer described above may function as the solvent.

Above all, it is preferable to contain an organic solvent having a boiling point of 180° C. or more from the viewpoint that the ink jettability can be maintained for a long period of time.

Examples of the high boiling point organic solvent include phenoxyethanol, ethylene glycol monomethyl ether, diethylene glycol monomethyl ether, diethylene glycol monoethyl ether, diethylene glycol diethyl ether, and the like.

Only one solvent may be used, or two or more solvents may be used.

The solvent is an optional component, and the type and content thereof can be appropriately selected and contained according to the desired physical properties of the ink.

(Applying Inks)

The image forming method of the present disclosure includes a step of applying the above-described inks onto a base material by an inkjet method.

The inks can be applied by adopting a known inkjet method. The inks are ejected by the inkjet method and applied onto the base material. Then, it is cured to form dots, and an image is formed by an aggregate of the formed dots.

Usually, a large number of dots are applied on a substrate to form an image. In the image forming method of the present disclosure, the inks are applied imagewisely onto the base material such that the total application amount of the inks provides an image area ratio of 50% or more in the image forming region.

In a case where the total application amount of the inks provides an image area ratio of 50% or more, an image can be reproduced in a wide color reproduction range on the base material. Accordingly, in a case where the image area ratio is 50% or more, an image having excellent color reproducibility and a gloss unique to the liquid crystal compound is formed.

The image area ratio that can be used in the image forming method of the present disclosure is 50% or more, preferably 70% or more, and more preferably 100%.

It should be noted that it is also a preferable aspect to form an image including a portion having the image with an image area ratio of less than 50% in addition to the image with the image area ratio of 50% or more formed by the image forming method of the present disclosure for the purpose of expressing a desired design property or achieving a higher color reproduction range.

As described above, it is needless to say that the image forming method of the present disclosure includes forming the image including the portion having the image with the image area ratio of less than 50% in addition to the image with the image area ratio of 50% or more.

However, even in a case where the portion having the image with the image area ratio of less than 50% is included, the image area ratio of the entire formed image is preferably 50% or more.

In the image forming method of the present disclosure, the density of the image to be formed can be changed by changing the application amount of one ink of at least two inks.

It is possible to express the shade of color tone by changing the total application amount of the inks applied on the base material, in other words, the density of dots formed by the inks applied per unit area.

As a method for forming a dot pattern and a method for changing the density of ink dots, a method in a known printing technique by an inkjet method can be applied.

According to the image forming method of the present disclosure, one image is formed by two or more different inks from each other. That is, in an image, dots having a plurality of regions for reflecting light in wavelength regions different from each other, dots having a layer for reflecting right-circular polarization and a region for reflecting left-circular polarization can be formed. In this case, first, the first ink, which will be a layer on the substrate side, is ejected by an inkjet method and cured to form the first layer. Next, the second ink, which will be the second layer and has a composition different from that of the first ink, is ejected on the first layer and cured to form the second layer, and further, as desired, the third and subsequent layers are formed by the same method, thereby forming an image having a plurality of regions having different wavelength regions of reflected light or different polarization directions.

In addition, since the density of the dots can express the shade of color, according to the image forming method of the present disclosure, a high-quality image having a wide color reproduction range can be formed by effectively combining a plurality of color tones and controlling the shade of each color tone.

The image formed by the image forming method of the present disclosure, that is, a selective reflection wavelength in the cholesteric liquid crystal layer can be set to any range of visible light (about 380~780 nm) and near-infrared light (about 780~2000 nm), and the setting method is as described above.

As the selective reflection wavelength of the cholesteric liquid crystal layer (reflective region), for example, red light (light in the 620 nm to 750 nm wavelength range) may be used as the selective reflection wavelength, green light (light in the 495 nm to 570 nm wavelength range) may be used as the selective reflection wavelength, blue light (light in the 420 nm to 490 nm wavelength range) may be used as the selective reflection wavelength, or another wavelength region may be used as the selective reflection wavelength.

Alternatively, it may have a reflective region in which infrared rays are used as the selective reflection wavelength. It should be noted that the infrared rays are light having a wavelength range of more than 780 nm and less than 1 mm, and a near-infrared region is light having a wavelength range of more than 780 nm and less than 2000 nm.

In addition, it may also have a reflection region that an ultraviolet region is used as a selective reflection wavelength. It should be noted that the ultraviolet region is a wavelength region of 10 nm or more and less than 380 nm.

For example, in a case where a solid image having a silver gloss is formed, three inks that exhibit reflected light of red (R), green (G), and blue (B) as reflected light may be applied to the base material, in consideration of color balance of the image to be formed, such that each ink provides an image area ratio of 50% or more. According to the image forming method of the present disclosure, it is possible to form the image having the metallic gloss, which has been difficult in the past, on an optional base material such as a resin.

The image formed by the image forming method of the present disclosure is the cholesteric liquid crystal layer, an image that selectively reflects light of a predetermined wavelength is formed, and the selective reflection wavelength can be adjusted appropriately. Therefore, according to the image formed by the image forming method of the present disclosure, it is possible to decorate the appearance of, for example, an optional molded body with an optional color, and to impart various optional designability by a simple method.

—Base Material—

In the image forming method of the present disclosure, since an image is formed by applying inks having photo-curing properties to the base material by an inkjet method, the base material to which the inks are applied is not particularly limited, and the image can be formed on an optional base material by the inkjet method.

In a case where the image having excellent color reproducibility is formed by the image forming method of the present disclosure, the base material is preferably a light-absorbing base material.

As the light-absorbing base material, a base material having visible light absorbance of 50% or more from a light incident direction of the base material is preferable, and light-absorbing property is good, and a black base material is preferably used from the viewpoint of further improving the quality of the formed image.

Examples of the black base material include a resin base material containing a black pigment, a resin-coated paper base material, and a base material obtained by subjecting a metal base material to a black treatment such as alumite treatment. In addition, a molded body selected from optional resin and metal may be used as the base material. In a case where the molded body is used as the base material, a surface of the base material can be decorated by the image forming method of the present disclosure.

The visible light absorbance of the base material can be measured by a spectrophotometer V570 (manufactured by JASCO Corporation). It should be noted that the visible light absorbance of 50% or more means that the light absorbance of 50% or more is indicated in the entire visible light region of wavelength 380 nm to 780 nm.

In order to improve the acceptability of the inks each containing a liquid crystal compound, for example, a base layer including a cured product and the like of a polyfunctional acrylate monomer may be formed on the base material.

Examples of a method of forming the base layer include a method of applying a composition for forming the base layer including the polyfunctional acrylate monomer, the solvent, and the polymerization initiator onto the surface of the base material and applying energy to cure the composition.

<Other Steps>

The image forming method of the present disclosure may include other steps. Other steps include a step of drying the inks applied onto the base material, a step of heating and aligning the liquid crystal material applied onto the base material, a step of curing the inks by applying energy to the inks applied onto the base material, a step of forming an overcoat layer, a step of further applying an ink (another Ink) other than the inks each including the above-described polymerizable liquid crystal compound or the like used in the image forming method of the present disclosure on the base material, and a step of further forming (printing) an image including no liquid crystal compound by applying another ink to the base material by a printing method other than the inkjet method.

(Drying of Inks)

The inks after application onto the base material may be dried or heated as necessary and then cured. That is, the image forming method of the present disclosure can include a step of drying the inks.

The inks can be dried by heating. In a case of drying by heating, the heating temperature is preferably 200° C. or less, and more preferably 130° C. or less.

Here, drying does not necessarily mean that the inks are in an absolutely dry state, but means that the content of a liquid component such as a solvent contained in each ink is reduced as compared with that before drying.

(Alignment of Liquid Crystal Material)

The polymerizable liquid crystal compound included in each ink applied onto the base material can be aligned to generate a desired color. Examples of a method for aligning the polymerizable liquid crystal compound include a method in which the applied ink is dried as desired, the solvent is removed, and then the ink is heated. In a case where the drying is performed by heating, the heating conditions can be 50° C. or more and 200° C. or less, preferably 60° C. or more and 150° C. or less, and more preferably 70° C. or more and 120° C. or less. The polymerizable liquid crystal compound can be favorably aligned by heating under the above-described heating conditions.

(Curing of Ink)

Each ink is cured and the image is formed by polymerizing the aligned polymerizable liquid crystal compound. Polymerization in a case where the ink is cured by polymerization may be either thermal polymerization or photopolymerization by light irradiation, but the photopolymerization is preferred. That is, the photopolymerization initiator contained in the ink generates active species by light irradiation, and each compound having a polymerizable group contained in the ink is polymerized and cured to form the image. That is, the image forming method of the present disclosure can include a step of curing the ink.

In a case where the ink is cured by photopolymerization, it is preferable to use ultraviolet irradiation for light irradiation. The irradiation energy is preferably 20 mJ/cm$^2$ to 50 J/cm$^2$, more preferably 100 mJ/cm$^2$ to 1,500 mJ/cm$^2$. In order to accelerate the photopolymerization reaction, the light irradiation may be performed under heating conditions or under a nitrogen atmosphere.

The wavelength of the ultraviolet rays to be irradiated is preferably 250 nm to 430 nm. From the viewpoint of the stability of the formed image, the polymerization reaction rate is preferably high, specifically 70% or more is preferable, and 80% or more is more preferable. The polymerization reaction rate can be measured by determining a consumption rate of the polymerizable functional group using an IR absorption spectrum.

(Formation of Overcoat Layer)

The overcoat layer may be further formed on the surface of the image formed by curing the inks on the base material.

The overcoat layer can be provided on the surface side of the base material on which the image is formed. Since the image forming surface is flattened by forming the overcoat layer, it is preferable.

The overcoat layer is not particularly limited, but is preferably formed as a resin layer including a resin material having a small difference in a refractive index from the formed image, and the difference in a refractive index between the image and the resin layer forming the overcoat layer is preferably 0.04 or less.

Since the image including the liquid crystal compound has a refractive index of about 1.6, it is preferable to use a resin layer having a refractive index of about 1.4 to 1.8 as the overcoat layer.

The angle from the normal line of light actually incident on the image (hereinafter, sometimes referred to as a polar angle) can be reduced by using the overcoat layer having a refractive index close to the refractive index of the image. For example, in a case where the overcoat layer having the refractive index of 1.6 is used and light is incident on a transparent screen at a polar angle of 45°, the polar angle actually incident on the image can be about 27°. Therefore, it is possible to widen the polar angle of light in which the formed image indicates retroreflectivity by using the overcoat layer, and higher retroreflectivity can be obtained over a wider range even in imagewise dots in which the angle between the base material and the image surface formed on one surface of the base material is small. In addition, the overcoat layer may have a function as an antireflection layer, a pressure sensitive adhesive layer, an adhesive layer, or a hard coat layer.

Examples of the overcoat layer include a resin layer obtained by applying a composition including the monomer to the surface side of the base material on which the image is formed to form a coating film, and then curing the coating film.

The resin used for forming the overcoat layer is not particularly limited, and may be selected in consideration of adhesiveness to the substrate or the liquid crystal material forming the dots. For forming the overcoat layer, for example, a raw material monomer such as a thermoplastic resin, a thermosetting resin, or an ultraviolet curing resin can be used. From the viewpoint of durability, solvent resistance and the like, a resin of a type that is cured by cross-linking is preferable, and an ultraviolet curing resin that can be cured in a short time is particularly preferable.

Monomers that can be used to form the overcoat layer include ethyl (meth) acrylate, ethylhexyl (meth) acrylate, styrene, methylstyrene, N-vinylpyrrolidone, polymethylolpropanetri (meth) acrylate, hexanediol (meth) acrylate, tripropylene glycol di (meth) acrylate, diethylene glycol di (meth) acrylate, pentaerythritol tri (meth) acrylate, dipentaerythritol hexa (meth) acrylate, 1,6-hexanediol di (meth) acrylate, neopentyl glycol di (meth) acrylate, and the like.

The thickness of the overcoat layer is not particularly limited. The thickness of the overcoat layer may be determined in consideration of the maximum dot height, and may be about 5 µm to 100 µm, preferably 10 µm to 50 µm, and more preferably 20 µm to 40 µm. It should be noted that the thickness of the overcoat layer is a distance from the dot forming surface of the substrate in a portion having no dots to the surface of the overcoat layer on an opposing surface.

(Step of Further Applying Other Inks)

Other inks applicable to the image forming method of the present disclosure are not particularly limited. For example, existing process color inks, special color pigment inks, dye inks, and the like are preferably used. As the special color inks, inks containing a fluorescent dye, inks containing a metallic material, or the like may be used.

As other inks, both of aqueous inks and solvent inks can be used. In addition, UV inks that are cured by ultraviolet irradiation may be used, and solvent UV inks obtained by diluting UV inks with a solvent can be used.

Among them, in a case where other inks are used, UV inks and solvent UV inks are preferably used since they can be cured by the light irradiation like the inks containing the polymerizable liquid crystal compound described above.

(Step of Applying Other Inks to Base Material by Printing Method Other than Inkjet Method to Further Form (Print) Image Including No Liquid Crystal Compound)

Any existing printing method can be used as the printing methods (hereinafter, it may be referred to as other printing methods), other than the inkjet method, which can be used together with other inks in a case of applying the other inks to the image forming method of the present disclosure. Examples of other printing methods include an offset printing method, a flexographic printing method, a gravure printing method, a screen printing method, a dry electrophotographic method, and a wet electrophotographic method.

Various desired and effective designs can be formed by further using the above-described other inks and other printing methods in the image forming method of the present disclosure.

EXAMPLE

Hereinafter, the image forming method of the present disclosure will be specifically described with reference to the following examples. Materials, reagents, usage amounts, substance amounts, rates, processing contents, processing procedures, and the like shown in the following examples can be appropriately changed without departing from the gist of the present disclosure.

Example 1

(Production of Base Layer)

Each compound described in the composition shown below is stirred and dissolved in a container kept at 25° C. to prepare the composition for forming the base layer.

| (Composition) | (parts by mass) |
|---|---|
| Propylene glycol monomethyl ether acetate | 67.8 |
| Dipentaerythritol hexaacrylate (manufactured by Nippon Kayaku Co., Ltd., trade name: KAYARAD DPHA) | 5.0 |
| MEGAFACE (registered trademark) RS-90 (manufactured by DIC Corporation) | 26.7 |
| IRGACURE819 (manufactured by BASF) | 0.5 |

The composition for forming the base layer prepared above is applied onto a sheet metal JTDZS-AMB-A200-B150-T2 (manufactured by MISUMI Corporation) which has been subjected to an alumite (black) treatment, by using a #2.6 bar coater.

Thereafter, the film is heated under a condition that the film surface temperature becomes 50° C., dried for 60 seconds, and then irradiated with ultraviolet rays of 500 mJ/cm$^2$ by an ultraviolet irradiation device under a nitrogen purge having an oxygen density of 100 ppm or less to advance the crosslinking reaction, thereby producing the base layer on a sheet metal base material.

<Preparation of Cholesteric Liquid Crystal Inks>
(Cholesteric Liquid Crystal Ink Solution Gm)

The composition shown below is stirred and dissolved in the container kept at 25° C. to prepare a cholesteric liquid crystal ink solution Gm.

| (Preparation of ink Gm) | (parts by mass) |
|---|---|
| Diethylene glycol diethyl ether | 392.05 |
| The following mixture of rod-shaped liquid crystal compound (polymerizable liquid crystal compound) | 100.0 |
| IRGACURE 819 (manufactured by BASF: polymerization initiator) | 2.0 |
| Chiral compound A having the following structure | 5.78 |
| Surfactant of the following structure | 0.08 |

(Rod-Shaped Polymerizable Liquid Crystal Compound)

The composition includes 84% by mass of the following exemplified compound (12), 14% by mass of the exemplified compound (13) and 2% by mass of the exemplified compound (14) with respect to the total content of the polymerizable liquid crystal compound.

(12)

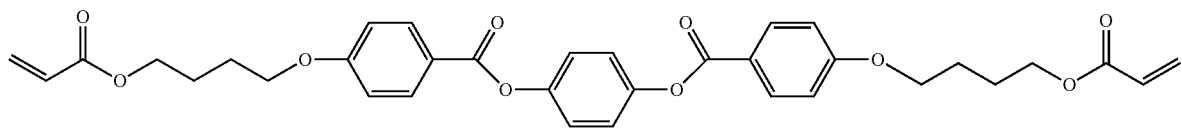

(13)

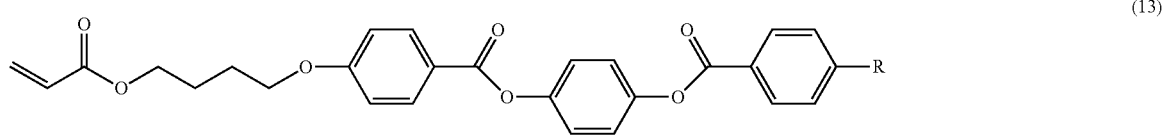

(14)

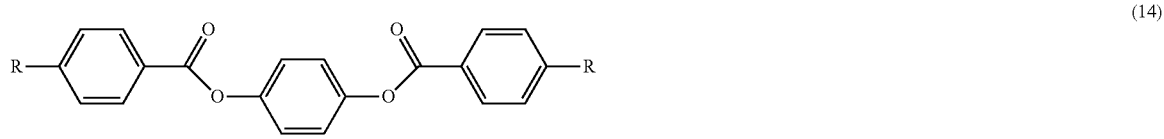

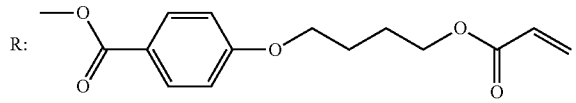

-continued

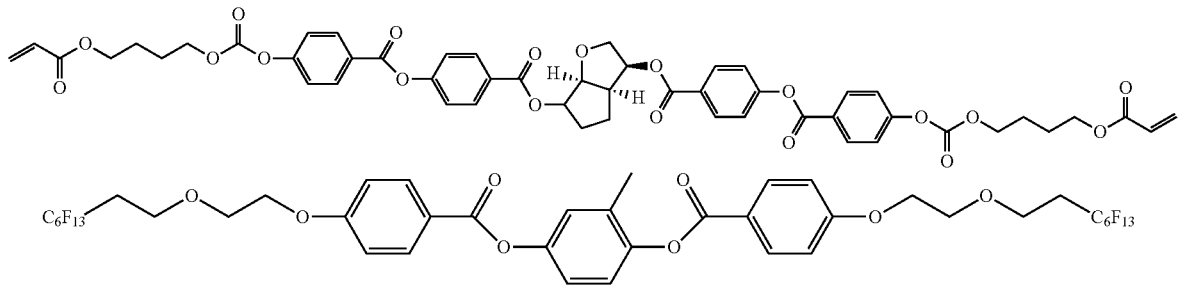

(Chiral Compound A)

(Surfactant: Fluorine-based Surfactant)

The cholesteric liquid crystal ink solution Gm (hereinafter referred to as ink Gm) is a material that forms dots that reflect light having a center wavelength of 550 nm. In addition, the ink Gm is a material that forms dots that reflect right-circular polarization. That is, the ink Gm, which is a cholesteric liquid crystal ink solution, is a material for forming right-handed polarizing green dots.

(Preparation of Cholesteric Liquid Crystal Ink Solution Bm)

A cholesteric liquid crystal ink solution Rm (hereinafter referred to as ink Rm) is prepared in the same manner as the cholesteric liquid crystal ink solution Gm except that the addition amount of the chiral compound A is changed from 5.78 parts by mass to 4.66 parts by mass.

The ink Rm is ink for forming right-handed polarizing red dots that reflect right-circular polarization having a center wavelength of 650 nm.

(Preparation of Cholesteric Liquid Crystal Ink Solution Rm)

A cholesteric liquid crystal ink solution Bm (hereinafter referred to as ink Bm) is prepared in the same manner as the cholesteric liquid crystal ink solution Gm except that the addition amount of the chiral compound A is changed from 5.78 parts by mass to 7.61 parts by mass.

The ink Bm is ink for forming right-handed polarizing blue dots that reflect right-circular polarization having a center wavelength of 450 nm.

<Formation of Ink Image by Inkjet Method 1>

An image is formed on a base layer formation surface of the base material having the base layer obtained above with ink Gm, ink Rm, and ink Bm using a DMP-2831 printer manufactured by FUJIFILM Dimatix, Inc.

The application of each ink for image formation is performed by a head capable of obtaining a jetting amount of image resolution 1200 dpi (dot per inch (2.54 cm))×1200 dpi 10 pl (picoliter) to form an A5 solid image. At this time, a hot plate is installed on a platen, and the temperature of the hot plate is set to 60° C.

After the image formation is ended, a sample is stored in an oven at 80° C. for 5 minutes and irradiated with ultraviolet rays of 500 mJ/cm² with a metal halide light source to cure the ink image.

The image area ratio of the obtained ink image is 100% as the total amount of the ink application amount of the three colors. The obtained image is visually confirmed to have sufficient color reproducibility.

<Formation of Ink Image by Inkjet Method 2>

A solid image of A5 is formed by inserting Rm into a throttle of cyan ink, Gm into a throttle of magenta ink, and Bm into a throttle of yellow ink of an inkjet printer UJF3042 manufactured by Mimaki Engineering Co., Ltd. on the base layer formation surface of the base material having the base layer obtained above.

The printing is performed under the condition of 1200 dpi×720 dpi 36 pass unidirectional printing.

In a case of forming an image, the hot plate is installed on the platen, and the temperature of the hot plate is set to 60° C.

After the image formation is ended, a sample is stored in an oven at 80° C. for 5 minutes and irradiated with ultraviolet rays of 500 mJ/cm² with a metal halide light source to cure the ink image.

The image area ratio of the obtained ink image is 100% as the total amount of the ink application amount of the three colors. The obtained image is visually confirmed to have sufficient color reproducibility.

Comparative Example 1

Using the material of example 1, the image area ratio of the image to be formed is printed under the same printing conditions as in example 1 disclosed in paragraph [0106] of JP2016-090993A.

As the base material, the sheet metal with the base layer is used in the same manner as in example 1.

The above printing conditions are those required for the transparent screen. In a case where the application amounts of the inks used in the image forming method of the present disclosure are larger than the above conditions, the transparency is reduced.

It should be noted that printing is performed with both the DMP2831 printer used in Formation of Ink Image 1 and the UJF3042 printer used in Formation of Ink Image 2.

The image area ratio of the obtained image is 19.5% as the total amount of the ink application amounts of the three colors. The obtained image cannot sufficiently reproduce color, especially in the high-density region.

Comparative Example 2

Inks (referred to as ink C1, ink C2, ink C3, ink C4, ink C5, and ink C6, respectively) of examples 1 to 6 are produced in the same manner as in the examples disclosed in paragraphs [0101] and [0102], and [Table 1] of JP2011-195747A.

Using the obtained inks, printing is performed with both the DMP2831 printer used in the Formation of Ink Image 1 of example 1 and the UJF3042 printer used in the Formation of Ink Image 2 of example 1.

[Evaluation]
(1. Jettability Evaluation: Formation of Ink Image 1: Dmp-2831)

The jettability of DMP-2831 is evaluated. In a case where the above-mentioned solid image is formed, the formed image is visually confirmed and evaluated according to the following standard.

A: Streaks are not seen and good images are formed.
B: There are some streaks, but images are formed.
C: Image cannot be formed since it cannot be ejected at all.

(2. Jettability Evaluation: Formation of Ink Image 2: Ujf3042)

The jettability of UJF3042 is evaluated. In a case where a color reproduction region confirmation image described later is formed, the formed image is visually confirmed and evaluated according to the following standard.

A: Streaks are not seen and good images are formed.
B: There are some streaks, but images are formed.
C: Image cannot be formed since it cannot be ejected at all.

(3. Color Reproduction Range)

In order to output a chart to be used for evaluating the following color reproduction range according to the method of Formation of Ink Image 2 described above, an image is formed by varying the image area ratio of an image formed by dots of each ink from 0% to 100%, images with different image area ratio are formed, and the color reproduction region of the obtained sample (image) is measured.

Evaluation Method:

The volume of a color reproduction space is defined by the volume of a CIE $L^*a^*b^*$ (1976) space.

In a case of having a color space as shown in FIG. 1, the color space is divided by an $L^*$ value, projected onto $a^*b^*$ planar surface, the volume in each $L^*$ region is calculated from the area of each $a^*b^*$ planar surface and the range of the $L^*$ value, and finally, the total volume is calculated by totaling the volumes of all the $L^*$ regions.

Specifically, in a case of the right figure (figure of $a^*b^*$ value in a range of $8<L<12$), the area ($S_{8<L^*<12}$) of polygonal shape (yellow-green line) connecting the outermost borders in the planar surface can be obtained by calculation.

At this time, it is assumed that the volume in an $L^*a^*b^*$ space of $8<L<12$ (the range of $L^*$ is 4) is $S_{8<L^*<12} \times 4$.

In addition to the above method, by changing the range of $L^*$ value, the volume is calculated in the same manner in the regions of $0<L<4$, $4<L<8$, $12<L<16$, and the volume is calculated by totaling them.

In a case where the obtained volume is large and a three-dimensional structure can be formed, it is evaluated that the range of color reproduction is wide, and in a case where the volume is small, it is evaluated that the range of color reproduction is narrow and the color reproduction cannot be performed within a limited range. The reproducible color range is evaluated according to the following evaluation standard.

—Evaluation Standard—

A: A three-dimensional structure is formed in the $L^*a^*b^*$ space, enabling color reproduction in a wide range inside the three-dimensional structure.
B: Color reproduction is possible only in a limited range in the $L^*a^*b^*$ space.

In a case where the volume is calculated on the basis of the above method, it is calculated that the volume of a case where an image is formed with halftone dots by the inkjet method has a volume more than twice as large as that in a case where an image is formed by a printing method, for example, offset printing other than the conventional method or the inkjet method.

Having more than twice the color reproduction region by volume can be interpreted as being able to express a difference of "a level that can be recognized as a different color" even in a case where it is a general person who is not proficient in color identification, and simultaneous observation is not performed side by side.

The results are shown in Table 1 below.

Figure 2:
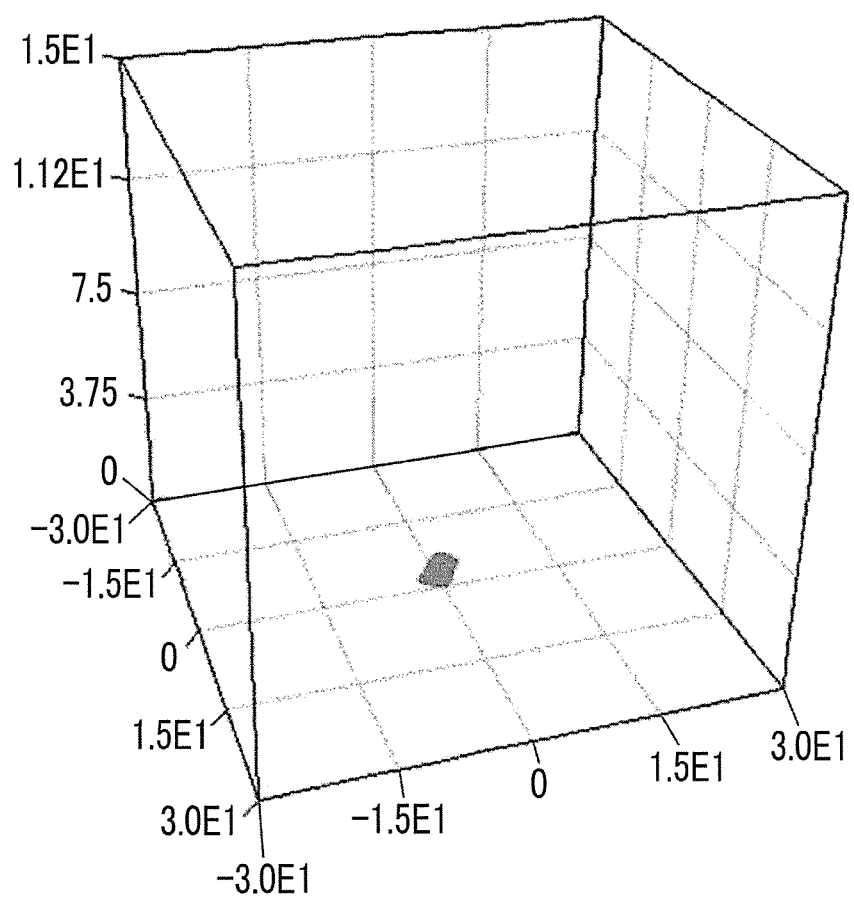
FIG. 2 is a graph showing a volume of a color reproduction region of an image obtained by an image forming method of Comparative Example 1 in a CIE L*a*b*(1976) space.

In addition, in the CIE $L^*a^*b^*$(1976) space, the volume of the color reproduction region of the image obtained by the image forming method of example 1 is shown in FIG. 1, and the volume of the color reproduction region of the image obtained by the image forming method of comparative example 1 is shown in FIG. 2. In comparison between FIGS. 1 and 2, it can be seen that the image formed by the image forming method of example 1 has an extremely wide color reproduction region as compared with the image formed by the image forming method of comparative example 1.

TABLE 1

|  | Ink | Ink jettability DMP-2831 | UJF-3042 | Color reproduction range |
|---|---|---|---|---|
| Example 1 | Gm | A | A | A |
|  | Rm | A | A |  |
|  | Bm | A | A |  |
| Comparative Example 1 | Gm | A | A | B |
|  | Rm | A | A |  |
|  | Bm | A | A |  |
| Comparative Example 2 | C1 | C | No jetting | Color reproducibility is not evaluated because of bad jettability. |
|  | C2 | C | No jetting |  |
|  | C3 | C | No jetting |  |
|  | C4 | C | No jetting |  |
|  | C5 | C | No jetting |  |
|  | C6 | C | No jetting |  |

In the image forming method of example 1, it is understood that it is possible to form a high-definition decorative image in a wide color reproduction range by the inkjet method.

On the other hand, in a case where printing is performed under the condition of the image area ratio of comparative example 1(19.5%), even in a case where the same inks as those of example 1 are used, the color reproduction region is extremely narrow, and high-definition images cannot be formed.

In a case where each ink of comparative example 2 is used, a fine image having a jetting amount of 10 pl is made to be formed by an inkjet method, but neither of inks C1 to C6 can be ejected by an inkjet recording device of the DMP-2831 and the UJF-3042.

Example 2

Each of the ink Gm2, the ink Bm2, and the ink Rm2 is adjusted in the same manner as in example 1, the image is formed in the same manner as in example 1, and an evaluation is performed, except that the content of the polymerizable liquid crystal compound in the ink is adjusted such that a predetermined wavelength is obtained by using the following polymerizable liquid crystal compound (exemplified compounds described above (15)) instead of the three kinds of rod-shaped polymerizable liquid crystal compounds used in the ink Gm, the ink Bm, and the ink Rm in example 1.

It should be noted that in each of the polymerizable liquid crystal compounds described below, the reflection wavelength continuously changes from the long-wavelength side to the short-wavelength side according to the addition amount of the chiral compound. That is, in a case where the addition amount of the chiral compound is small, a red color is obtained, and as the amount increases, the color continuously changes from green to blue, and then, it is possible to easily obtain inks having different reflection wavelengths that express desired color tone.

(15)

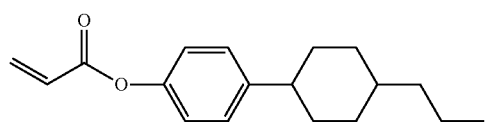

Example 3

Each of the ink Gm3, the ink Bm3, and the ink Rm3 is adjusted in the same manner as in example 1, the image is formed in the same manner as in example 1, and an evaluation is performed, except that the content of the polymerizable liquid crystal compound in the ink is adjusted such that a predetermined wavelength is obtained by using the following polymerizable liquid crystal compound (exemplified compounds (16)) instead of the three kinds of rod-shaped polymerizable liquid crystal compounds used in the ink Gm, the ink Bm, and the ink Rm in example 1.

(16)

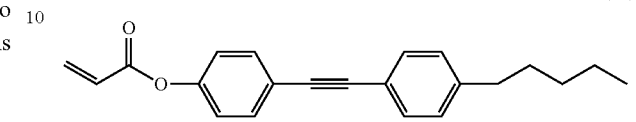

Example 4

Each of the ink Gm4, the ink Bm4, and the ink Rm4 is adjusted in the same manner as in example 1, the image is formed in the same manner as in example 1, and an evaluation is performed, except that the content of the polymerizable liquid crystal compound in the ink is adjusted such that a predetermined wavelength is obtained by using the following polymerizable liquid crystal compound (exemplified compounds (17)) instead of the three kinds of rod-shaped polymerizable liquid crystal compounds used in the ink Gm, the ink Bm, and the ink Rm in example 1.

(17)

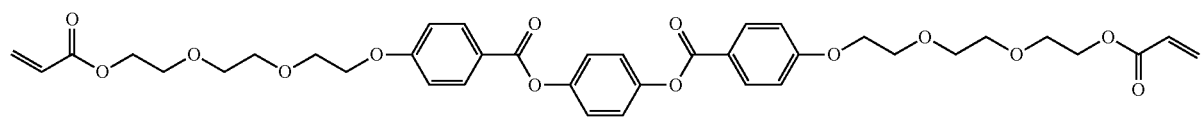

Example 5

Each of the ink Gm5, the ink Bm5, and the ink Rm5 is adjusted in the same manner as in example 1, the image is formed in the same manner as in example 1, and an evaluation is performed, except that the content of the polymerizable liquid crystal compound in the ink is adjusted such that a predetermined wavelength is obtained by using the following polymerizable liquid crystal compound (exemplified compounds (18)) instead of the three kinds of rod-shaped polymerizable liquid crystal compounds used in the ink Gm, the ink Bm, and the ink Rm in example 1.

(18)

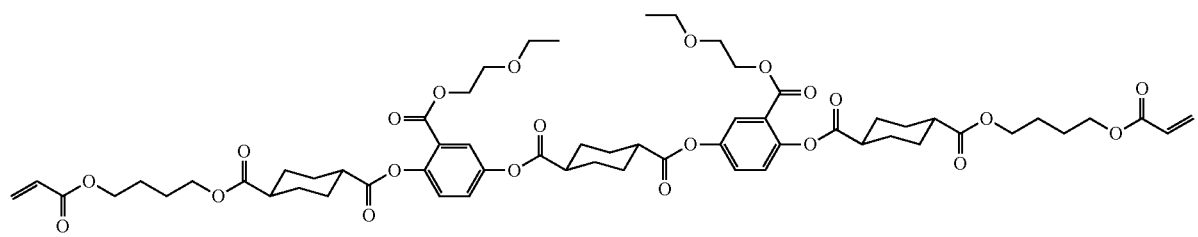

Example 6

Each of the ink Gm6, the ink Bm6, and the ink Rm6 is adjusted in the same manner as in example 1, the image is formed in the same manner as in example 1, and an evaluation is performed, except that the content of the polymerizable liquid crystal compound in the ink is adjusted such that a predetermined wavelength is obtained by using the following polymerizable liquid crystal compound (exemplified compounds (19)) instead of the three kinds of rod-shaped polymerizable liquid crystal compounds used in the ink Gm, the ink Bm, and the ink Rm in example 1.

Example 8

Each of the ink Gm8, the ink Bm8, and the ink Rm8 is adjusted in the same manner as in example 1, the image is formed in the same manner as in example 1, and an evaluation is performed, except that the content of the chiral compound in the ink is adjusted such that a predetermined wavelength is obtained by changing the chiral compound used in the ink Gm, the ink Bm, and the ink Rm in example 1 to the following chiral compound (exemplified compounds (22)).

The results are shown in Table 2 below.

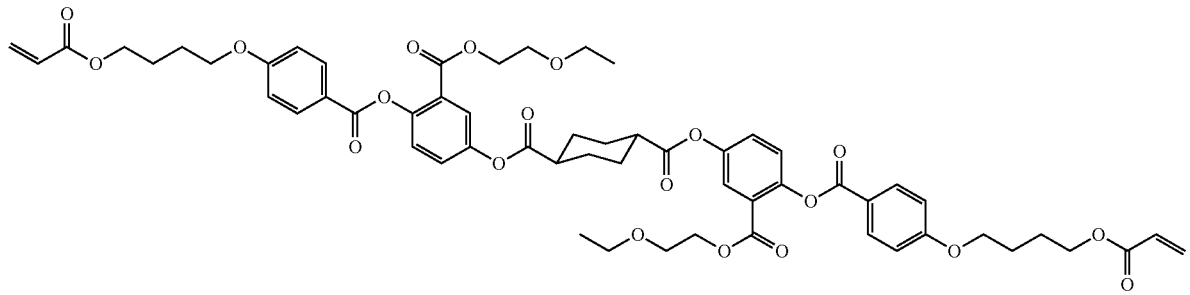

(19)

Example 7

Each of the ink Gm7, the ink Bm7, and the ink Rm7 is adjusted in the same manner as in example 1, the image is formed in the same manner as in example 1, and an evaluation is performed, except that the content of the chiral compound in the ink is adjusted such that a predetermined wavelength is obtained by changing the chiral compound used in the ink Gm, the ink Bm, and the ink Rm in example 1 to the following chiral compound (exemplified compounds (21)).

It should be noted that even in a case where the kind of the chiral compound is changed, the reflection wavelength of the ink continuously changes from the long-wavelength side to the short-wavelength side according to the change in the addition amount of the chiral compound added to the same polymerizable liquid crystal compound. Therefore, in examples 7 and 8, similarly to examples 2 to 6 in which the kind of the polymerizable liquid crystal compound is changed, it is possible to easily obtain inks having different reflection wavelengths that express desired color tone.

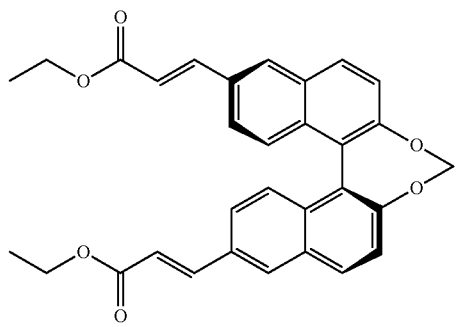

(22)

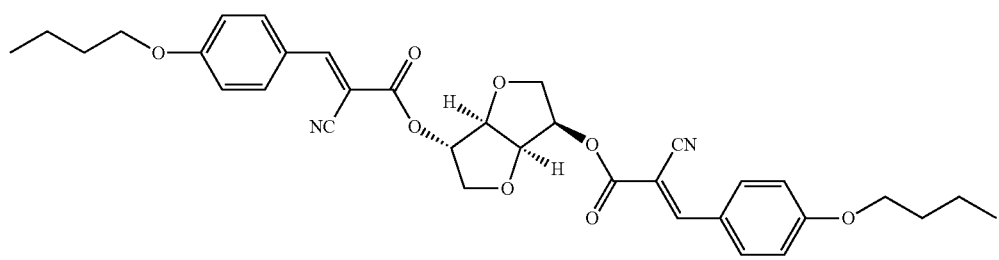

(21)

TABLE 2

|  | Ink | Ink jettability DMP-2831 | Ink jettability UJF-3042 | Color reproduction range |
|---|---|---|---|---|
| Example 2 | Gm2 | A | A | A |
|  | Rm2 | A | A |  |
|  | Bm2 | A | A |  |
| Example 3 | Gm3 | A | A | A |
|  | Rm3 | A | A |  |
|  | Bm3 | A | A |  |
| Example 4 | Gm4 | A | A | A |
|  | Rm4 | A | A |  |
|  | Bm4 | A | A |  |
| Example 5 | Gm5 | A | A | A |
|  | Rm5 | A | A |  |
|  | Bm5 | A | A |  |
| Example 6 | Gm6 | A | A | A |
|  | Rm6 | A | A |  |
|  | Bm6 | A | A |  |
| Example 7 | Gm7 | A | A | A |
|  | Rm7 | A | A |  |
|  | Bm7 | A | A |  |
| Example 8 | Gm8 | A | A | A |
|  | Rm8 | A | A |  |
|  | Bm8 | A | A |  |

From the description in Table 2, it is understood that according to the image forming method of examples 2 to 8, even in a case where the polymerizable liquid crystal compound or the chiral compound used is different, it is possible to print a high-definition decorative image in a wide color reproduction region by the inkjet method.

The disclosure of JP2018-065139A filed on Mar. 29, 2018 is incorporated into the present disclosure by reference.

All publications, patent applications, and technical standards described in the disclosure are herein incorporated by reference to the same extent as the case in which each of publication, patent application, and technical standard is specifically and individually described to be incorporated by reference.

What is claimed is:

1. An image forming method comprising:
   a step of imagewisely applying, onto a base material by an inkjet method, three inks containing a polymerizable liquid crystal compound, a chiral compound, and a polymerization initiator and having reflection wavelengths different from each other, such that the total application amount of the inks provides an image area ratio of 50% or more in an image forming region,
   wherein the three inks are an ink capable of forming a cholesteric liquid crystal layer having a selective reflection wavelength in a red light range (a wavelength range of 620 nm to 750 nm), an ink capable of forming a cholesteric liquid crystal layer having a selective reflection wavelength in a green light range (a wavelength range of 495 nm to 570 nm), and an ink capable of forming a cholesteric liquid crystal layer having a selective reflection wavelength in a blue light range (a wavelength range of 420 run to 490 nm), respectively, and
   the three inks differ from each other in at least one of the kind of polymerizable liquid crystal compound or the content of polymerizable liquid crystal compound.

2. The image forming method according to claim 1, wherein the three inks are inks having chiral compound contents different from each other.

3. The image forming method according to claim 1, wherein at least one of the three inks contains two or more polymerizable liquid crystal compounds different from each other.

4. The image forming method according to claim 1, wherein a density of an image to be formed is changed by changing an application amount of at least one of the three inks.

5. The image forming method according to claim 1, wherein the base material is a light-absorbing base material.

6. The image forming method according to claim 5, wherein a visible light absorbance of the base material is 50% or more.

7. The image forming method according to claim 1, wherein the three inks differ from each other in the content of polymerizable liquid crystal compound.

* * * * *